(12) United States Patent
Alkandry et al.

(10) Patent No.: US 11,376,600 B2
(45) Date of Patent: Jul. 5, 2022

(54) NON-CONTACT, ON-SLIDE FLUID MIXING

(71) Applicant: Ventana Medical Systems, Inc., Tucson, AZ (US)

(72) Inventors: Emily Alkandry, Olney, MD (US); Anik Duttaroy, Lorton, VA (US); Evan Graves, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 267 days.

(21) Appl. No.: 16/666,542

(22) Filed: Oct. 29, 2019

(65) Prior Publication Data

US 2020/0061623 A1    Feb. 27, 2020

Related U.S. Application Data

(63) Continuation of application No. PCT/IB2018/000885, filed on May 17, 2018.

(60) Provisional application No. 62/511,390, filed on May 26, 2017.

(51) Int. Cl.
| | |
|---|---|
| *B01F 31/20* | (2022.01) |
| *B01L 9/00* | (2006.01) |
| *G01N 1/31* | (2006.01) |
| *G01N 1/38* | (2006.01) |
| *B01F 101/23* | (2022.01) |

(52) U.S. Cl.
CPC .............. *B01L 9/52* (2013.01); *B01F 31/20* (2022.01); *B01F 31/28* (2022.01); *G01N 1/312* (2013.01); *G01N 1/38* (2013.01); *B01F 2101/23* (2022.01); *B01L 2400/0436* (2013.01); *B01L 2400/0496* (2013.01)

(58) Field of Classification Search
None
See application file for complete search history.

(56) References Cited

U.S. PATENT DOCUMENTS

| | | | |
|---|---|---|---|
| 6,291,180 B1 * | 9/2001 | Chu | G01N 1/30 422/20 |
| 2006/0024206 A1 | 2/2006 | Sinha et al. | |
| 2006/0073074 A1 | 4/2006 | Winther | |
| 2017/0010194 A1 | 1/2017 | Showalter et al. | |

FOREIGN PATENT DOCUMENTS

| | | |
|---|---|---|
| EP | 0983788 A2 | 3/2000 |
| JP | 2006153785 A | 6/2006 |
| JP | 2010119388 A | 6/2010 |
| JP | 2016109636 A | 6/2016 |

OTHER PUBLICATIONS

International Search Report and Written Opinion, dated Nov. 19, 2018, in corresponding PCT/IB2018/000885, filed May 17, 2018, pp. 1-13.

* cited by examiner

*Primary Examiner* — Jyoti Nagpaul
(74) *Attorney, Agent, or Firm* — Charney IP Law LLC; Thomas M. Finetti

(57) ABSTRACT

A microscope slide holder comprising a slide support member and at least one acoustic source for introducing acoustic waves to a microscope slide in communication with the slide support member such that one or more fluids present on the surface of the microscope slide are contactlessly mixed.

21 Claims, 20 Drawing Sheets

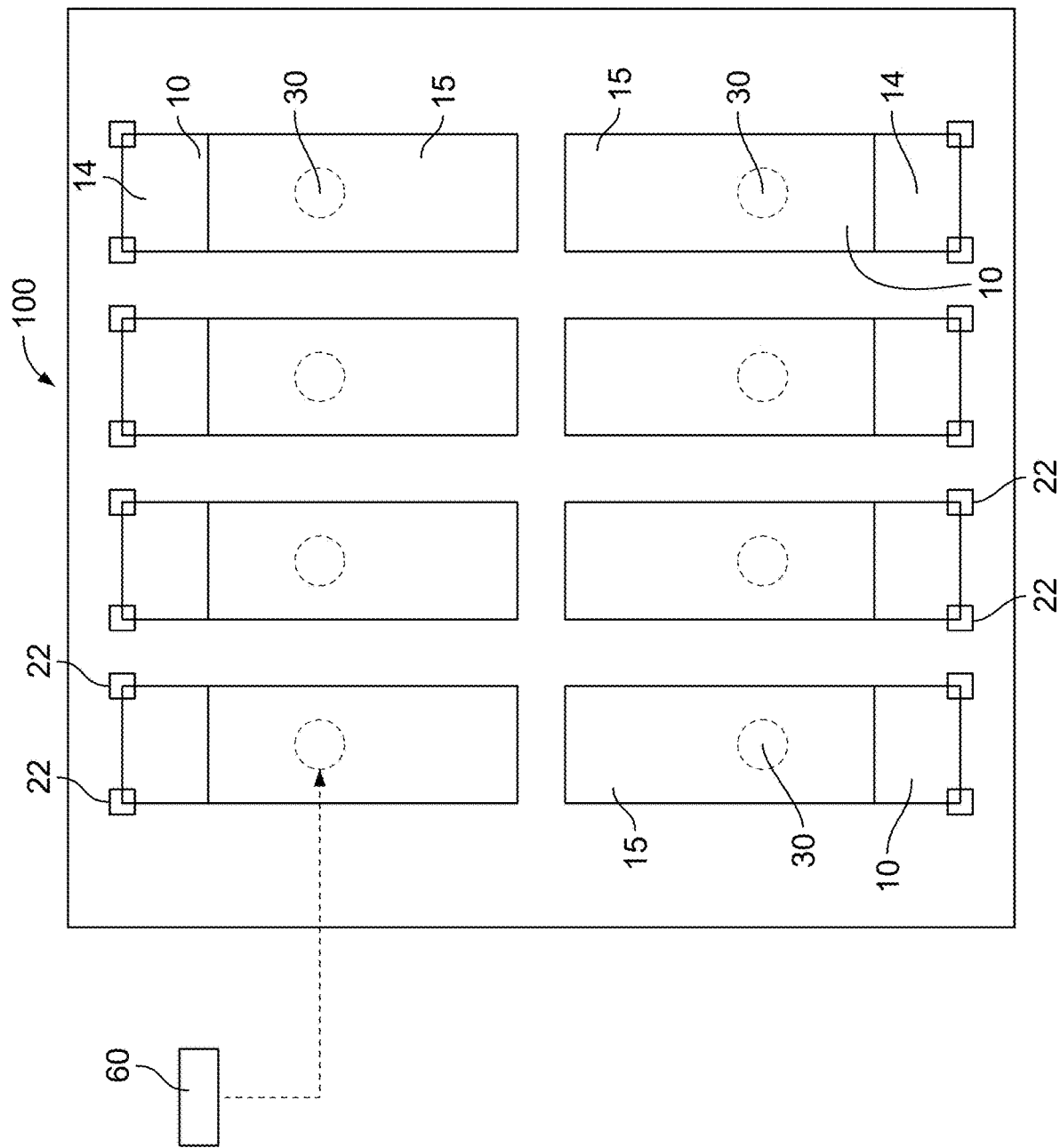

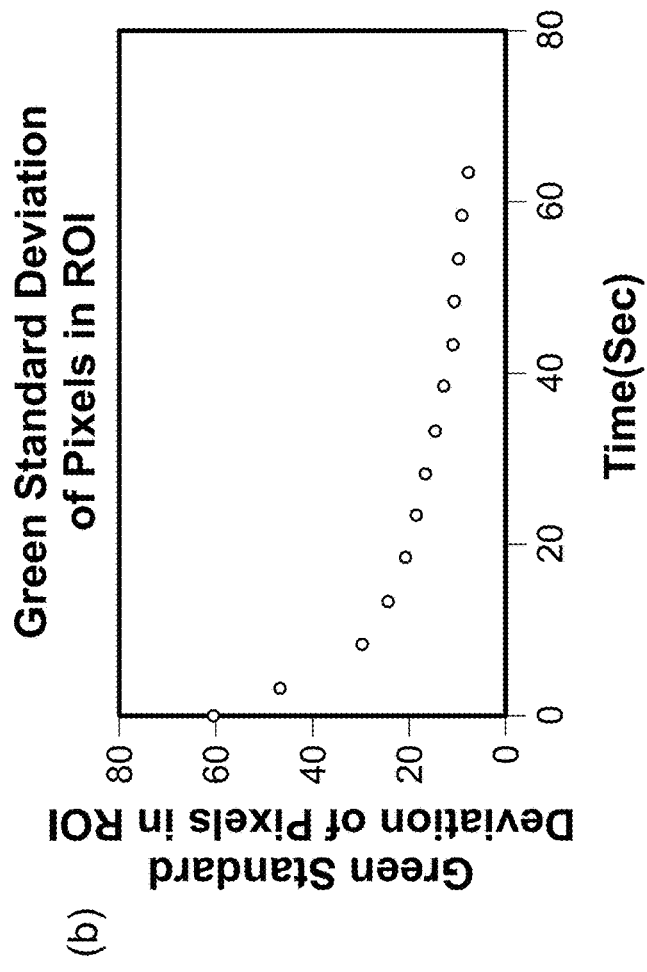
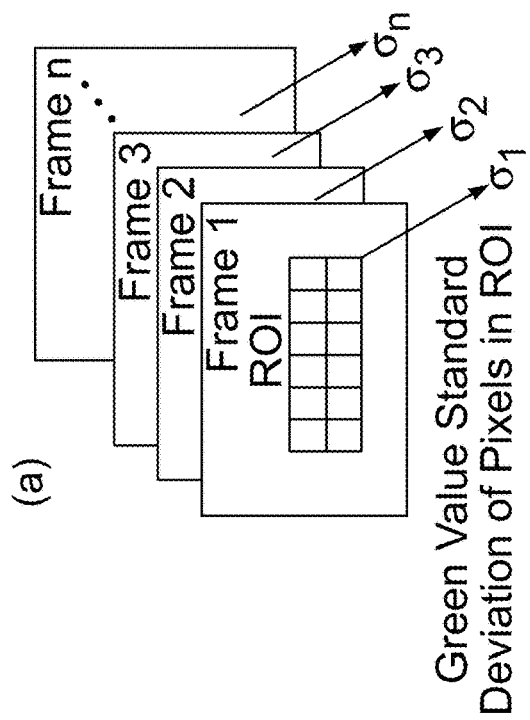
FIG. 8B

Before Mixing
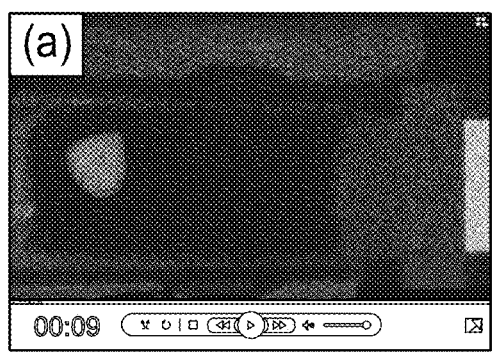
20 Secs Mixing
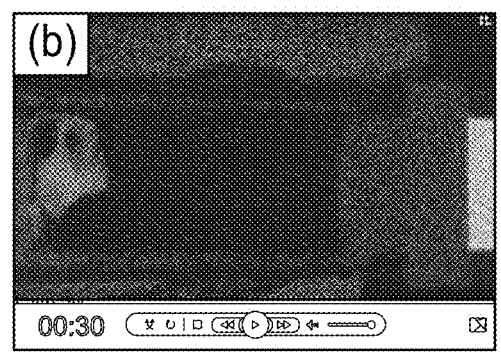
1:20 Mixing
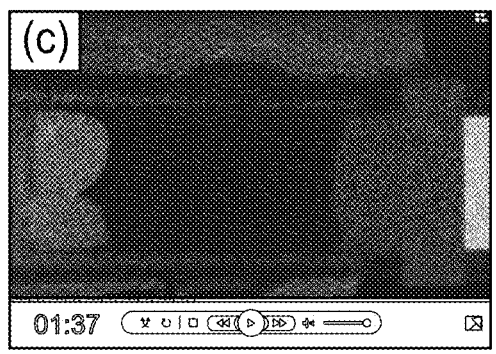
4+ Minutes of Mixing
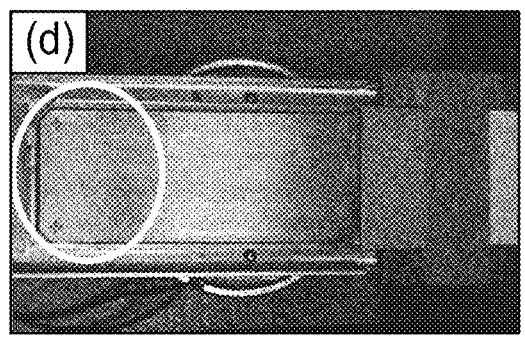
FIG. 10B

NON-CONTACT, ON-SLIDE FLUID MIXING

CROSS REFERENCE TO RELATED APPLICATIONS

The present application is a continuation of PCT Application No. PCT/IB2018/000885, filed on May 17, 2018, which application claims the benefit of the filing date of U.S. Provisional Patent Application No. 62/511,390, filed on May 26, 2017, the disclosure of which is hereby incorporated by reference herein in its entirety.

BACKGROUND OF THE DISCLOSURE

Many tissues do not retain enough color after processing to make their components visible under a bright-field microscope. Accordingly, it is common practice to add color and contrast to tissue components by staining the tissue with various reagents. In the past, the steps of staining a tissue sample for histological or cytological analysis were performed manually, a process that is inherently inconsistent. Inconsistent staining makes it difficult for a pathologist or other medical personnel to interpret slides and to make comparisons between different samples. Thus, a number of devices and methods have been described that serve to automate the staining process and reduce staining inconsistency.

Devices for automated staining, especially for high volume staining with traditional reagents such as hematoxylin and eosin (H&E), are primarily of a "dip and dunk" type, where racks of slides are automatically lowered into and removed from a series of reagent baths. For example, U.S. Pat. No. 4,911,098 to Tabata describes an automated staining apparatus, where microscope slides holding tissue specimens are dipped sequentially into a large number of chemical solution containers. The slides are mounted vertically in a slide holder basket and a clamp that engages and disengages the basket is used to move the slides from solution to solution. The clamp can include a mechanism to tilt the basket, which aids in removing excess solution before the basket is submerged in the next solution. Additional automated staining devices of the "dip and dunk" type are described in U.S. Pat. No. 5,573,727 to Keefe, U.S. Pat. No. 6,080,363 to Takahasi et al., U.S. Pat. No. 6,436,348 to Ljungmann et al. and U.S. Patent Application Publication No. 2001/0019703, naming Thiem et al. as inventors.

Another type of automatic staining apparatus delivers fresh reagents directly to individual slides. For example, U.S. Pat. No. 6,387,326 to Edwards et al. describes an apparatus for staining slides where slides are expelled one at a time from a slide storage device and individually treated at various staining stations as they move along a conveyor belt transport apparatus. Additional devices for automatically staining individual slides are described in U.S. Pat. No. 6,180,061 to Bogen et al., PCT Publication WO 03/045560, naming Tseung et al. as inventors, and U.S. Patent Application Publication No. U.S. 2004/0052685 naming Richards et al. as inventors.

Efficient mixing of fluids is an important step in many industrial, chemical, and pharmaceutical methods, as well as in biotechnological applications. The mixing at small scales is often a difficult task. In some embodiments, molecular diffusion becomes the main mixing mechanism, which makes the overall process slow. Integration of active mixers is often difficult, increases the costs of any such device, and introduces cross-contamination between samples.

BRIEF SUMMARY OF THE DISCLOSURE

Disclosed herein are systems and methods for the contactless dispersion, replenishment, and/or mixing of one or fluids on a substrate. Applicants have discovered that the use of low frequency acoustic or vibrational energy (e.g. at a frequency that will not damage cells, at a frequency of less than 2000 Hz, etc.) to replenish, distribute and/or mix one or more fluids present on the surface of a substrate allows for high mixing efficiency while maintaining low manufacturing and maintenance costs, reduced process times, and the prevention of contamination. Applicants have also surprisingly discovered that the introduction of such low frequency acoustic energy promotes mixing at small scales, due to the absorption of acoustic energy by waves generated within the one or more fluids. Applicants have also unexpectedly discovered that the aforementioned benefits may be realized without introducing damage to cells and/or tissue present on the substrate (e.g. by lysis or cell-membrane collapse), and without introducing unnecessarily heating the sample. Applicants have also discovered that mixing fluids according to the methods described herein (i) reduces the risk of staining artifacts, and (ii) allows for a uniform antibody reagent concentration across the cells and/or tissue during staining. It is also believed that the use of the devices and methods disclosed herein may permit the use of lower concentrations of detection probes (e.g. antibodies) in any staining procedure.

In one aspect of the present disclosure is a substrate holder or carrier having at least one support member and one or more acoustic sources (e.g. one or more transducers) for contactlessly mixing, dispersing, or replenishing fluid present on the surface of a substrate (e.g. a specimen-bearing microscope slide), the acoustic source being in communication with the support member or substrate. By "in communication with the support member or substrate" it is meant that, for example, the acoustic source is at least partially in contact with the support member or substrate or can be moved such that it is placed in at least partial contact with the support member or substrate. In some embodiments, the acoustic source is embedded within the support member, or that the acoustic source is in contact with another element which, in turn, contacts the support member or substrate. In some embodiments, the acoustic source is a mechanical transducer or piezoelectric transducer which operates at a low frequency (e.g. a frequency ranging from about 1 Hz to about 1 kHz). In some embodiments, the is a microscope slide. Other examples of substrates include surface-enhanced laser desorption/ionization ("SELDI") and matrix-assisted laser desorption/ionization ("MALDI") chips, and silicon wafers.

In another aspect of the present disclosure is a slide holder for contactlessly mixing, dispersing, or replenishing one or more fluids on a specimen-bearing slide (including fluids already present on a surface of the slide) comprising a slide support member and at least one transducer in communication with the slide support member, wherein the at least one transducer operates at a frequency that ranges from about 1 Hz to about 1 kHz. In some embodiments, the at least one transducer is in communication with a lower surface of the slide support member. In some embodiments, the at least one transducer is positioned along the slide support member at a region substantially corresponding to a center of the specimen end of the slide.

In some embodiments, at least two transducers are in communication with the slide support. In some embodiments, each of the at least two transducers are configured such that first acoustic waves (or a first series of acoustic waves) supplied by a first of the at least two transducers are not cancelled out by second acoustic waves (or a second series of acoustic waves) supplied by a second of the at least two transducers. In some embodiments, the at least two transducers are out-of-phase with each other.

In some embodiments, the at least one transducer operates at a frequency which ranges from about 1 Hz to about 500 Hz. In some embodiments, the frequency ranges from about 50 Hz to about 500 Hz. In some embodiments, the frequency ranges from about 100 Hz to about 200 Hz. In some embodiments, a power supplied to the at least one transducer ranges from about 40 mVpp to about 350 mVpp.

In some embodiments, the slide support has a support surface configured to support at least a portion of a back surface of the slide, the back surface being opposite a specimen-bearing surface. In some embodiments, the slide support further comprises a heating element. In some embodiments, the slide support further comprises a controller in electrical communication with the at least one transducer. In some embodiments, the controller includes an amplifier and a signal generator. In some embodiments, the slide holder is part of a staining apparatus or coverslipping apparatus, as described further herein. In other embodiments, the slide support is further configured to include a heating and/or cooling element such as a resistive heating element or a Peltier heating and cooling element.

In another aspect of the present disclosure is a slide support and at least one acoustic source for introducing low frequency vibrations to the slide such that one or more fluids present on the surface of the slide are contactlessly mixed. In some embodiments, the low frequency vibrations are acoustic waves. In some embodiments, the acoustic source for introducing low frequency vibrations is selected from the group consisting of a mechanical transducer, piezoelectric transducer, and a surface acoustic wave device.

In another aspect of the present disclosure is a slide tray comprising a plurality of the slide holders described above. In some embodiments, each slide holder positioned in substantially horizontal and co-planar, spaced positions. In other embodiments, each slide holder is posited along an arc. In another aspect is a moveable slide support including the slide holder described above.

In another aspect of the present disclosure is a staining apparatus comprising at least one of the slide holders (or slide trays) described herein and at least one dispenser (or other device) capable of introducing one or more fluids to a specimen-bearing surface of the slide. In some embodiments, the staining apparatus further comprises a feedback control device (e.g. a camera) for monitoring a mixing of the one or more fluids introduced on the surface of the specimen-bearing slide. In some embodiments, the dispersing of the reagent occurs without contacting the puddle or sample with any mixing apparatus or gas stream. In some embodiments, the staining apparatus further comprises an active mixing apparatus which contacts the fluid puddle on the surface of the slide. Fluid dispensers and other components for automated processing of biological specimens are disclosed in WO2015/086484, WO2010/080287, and U.S. Pat. No. 7,615,371, the disclosures of which are hereby incorporated by reference herein in their entireties.

In another aspect of the present disclosure are methods of contactlessly mixing, replenishing or distributing fluids present on the surface of a specimen-bearing slide, the mixing, replenishing or distribution of the fluids occurring without causing damage to any specimen present on the surface of the slide. In some embodiments, the mixing, replenishing, or distribution of fluids is accomplished with an acoustic source operating at a low frequency. In some embodiments, the method comprises dispensing a first fluid and second fluid on the slide, and contactlessly mixing the first and second fluids with acoustic waves.

In another aspect of the present disclosure is a method of processing specimen-bearing slides comprising: (i) contacting a sample on the specimen-bearing slide with a first reagent; and (ii) uniformly distributing the first reagent on the specimen-bearing by introducing low frequency acoustic waves to the specimen-bearing slide. In some embodiments, the low frequency acoustic waves are generated by at least one transducer in communication with the specimen-bearing slide. In some embodiments, the first reagent is dispensed into an existing fluid present on the specimen-bearing slide, and wherein the acoustic waves generated by the at least one transducer uniformly mixes the first reagent within the existing fluid. In some embodiments, the existing fluid is a buffer.

In some embodiments, the at least one transducer is configured to operate at a frequency that ranges from between about 1 Hz to about 1 kHz. In some embodiments, the frequency ranges from between about 50 Hz to about 500 Hz. In some embodiments, the frequency ranges from between about 100 Hz to about 200 Hz. In some embodiments, acoustic waves are introduced into the sample for a time period ranging from between about 1 second to about 120 seconds. In some embodiments, the time period ranges from between about 1 second to about 60 seconds. In some embodiments, the time period ranges from between about 1 second to about 30 seconds. In some embodiments, the time-period ranges from between about 2 seconds to about 15 seconds. In some embodiments, a bottom surface of the specimen-bearing slide is at least partially in contact with a substrate, and wherein the at least one transducer is coupled to the substrate.

In some embodiments, the first reagent is a detection probe specific to a first target within the sample. In some embodiments, the method further comprises the step of contacting the sample with a first detection reagent to facilitate detection of the first detection probe. In some embodiments, the method further comprises contacting the sample with a second detection probe specific to a second target. In some embodiments, the second detection probe is introduced simultaneously with the first detection probe, and wherein the at least one transducer mixes the first and second detection probes with the existing fluid. In some embodiments, the first and second detection probes are antibodies.

In another aspect of the present disclosure is a method of replenishing reagent comprising: (i) contacting a sample on a specimen-bearing slide with a first reagent; (ii) allowing time for the first reagent to react with or be absorbed by the sample; and (iii) uniformly distributing the first reagent on the specimen-bearing slide by introducing acoustic waves to the specimen-bearing slide, thereby replenishing reagent to those areas that have been at least partially depleted of reagent. In some embodiments, the method optionally comprises the step of introducing additional aliquots of the first reagent prior to uniformly distributing the first reagent through the introduction of acoustic waves. In some embodiments, the process may be repeated with additional reagents.

In another aspect of the present disclosure is a method of staining a sample comprising: (a) dispensing a reagent into a fluid puddle present on a sample-bearing slide; (b) contactlessly dispersing the reagent into the fluid puddle using low frequency acoustic waves, and wherein the dispersing of the reagent occurs without damaging cells or tissue within the sample. In some embodiments, the reagent is substantially uniformly dispersed within the fluid puddle within about 30 seconds after initiating the dispersing of the reagent. In some embodiments, the contactless dispensing of the reagent is accomplished using acoustic source is selected from the group consisting of a mechanical transducer, and piezoelectric transducer. In some embodiments, acoustic source operates at a frequency ranging from between about 100 Hz to about 200 Hz. In some embodiments, the reagent is a specific-binding moiety. In some embodiments, the specific-binding moiety comprises an antibody. In some embodiments, the method further comprises the step of dispensing a second reagent into the fluid puddle.

BRIEF DESCRIPTION OF THE FIGURES

FIG. 3 provides a top view of a slide tray comprising a plurality of microscope slide holders, where each slide holder is in communication with at least one transducer.

FIG. 8B illustrates (a) a standard deviation of the green value of the pixels in a region of interest (ROI) is calculated for each frame; provides (b) a plot of the green value standard deviation in the ROI during a mixing process.

FIG. 10B illustrates the distribution of a dye over time as acoustic waves are introduced.

DETAILED DESCRIPTION

Definitions

Figure 1A:
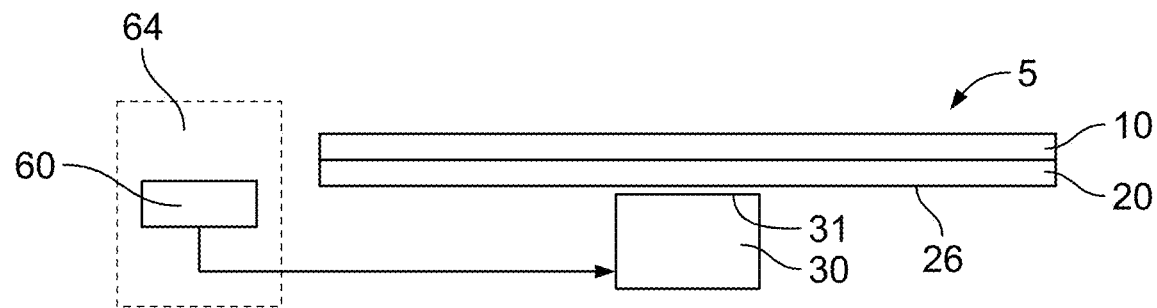
FIG. 1A provides a side view of a microscope slide holder in communication with a transducer.
Figure 1B:
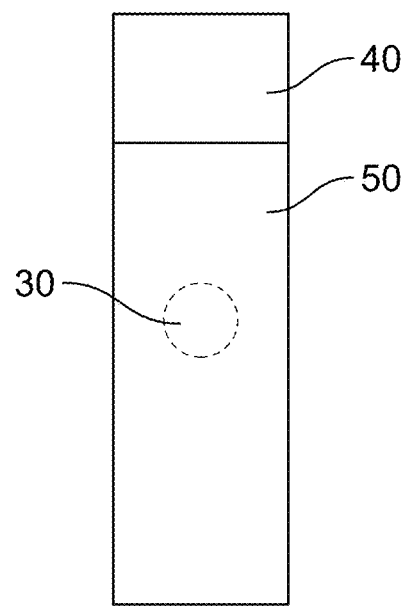
FIG. 1B provides a top view of a microscope slide holder in communication with a transducer.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, the term "acoustic waves" encompasses sonic energy, acoustic energy, acoustic pulses, sound energy, sound waves, sonic pulses, pulses, waves, or vibrational energy, or any other grammatical form of these terms, as well as any other type of energy that has similar characteristics to acoustic energy. Each of these terms may be used interchangeably herein.

As used herein, the term "antibody," refers to immunoglobulins or immunoglobulin-like molecules, including by way of example and without limitation, IgA, IgD, IgE, IgG and IgM, combinations thereof, and similar molecules produced during an immune response in any vertebrate, (e.g., in mammals such as humans, goats, rabbits and mice) and antibody fragments (such as F(ab')2 fragments, Fab' fragments, Fab'-SH fragments and Fab fragments as are known in the art, recombinant antibody fragments (such as sFv fragments, dsFv fragments, bispecific sFv fragments, bispecific dsFv fragments, F(ab)'2 fragments, single chain Fv proteins ("scFv"), disulfide stabilized Fv proteins ("dsFv"), diabodies, and triabodies (as are known in the art), and camelid antibodies) that specifically bind to a molecule of interest (or a group of highly similar molecules of interest) to the substantial exclusion of binding to other molecules. Antibody further refers to a polypeptide ligand comprising at least a light chain or heavy chain immunoglobulin variable region which specifically recognizes and binds an epitope of an antigen. Antibodies may be composed of a heavy and a light chain, each of which has a variable region, termed the variable heavy (VH) region and the variable light (VL) region. Together, the VH region and the VL region are responsible for binding the antigen recognized by the antibody. The term antibody also includes intact immunoglobulins and the variants and portions of them well known in the art.

As used herein, the term "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats, and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments, or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "fluid" refers to any liquid, including water, solvents, solutions (e.g. buffer solutions), etc. The term "fluids" also refers to any mixtures, colloids, suspensions, etc. The term "fluids" also encompasses reagents, stains, and other specimen processing agents (e.g. glues, fixatives, etc.) which may be applied to a microscope slide and/or specimen. The fluids may be aqueous or non-aqueous. Further examples include solutions or suspensions of antibodies, solutions or suspensions of nucleic acid probes, and solutions or suspensions of dye or stain molecules (e.g., H&E staining solutions, Pap staining solutions, etc.). Still further examples of fluids include solvents and/or solutions for deparaffinizing paraffin-embedded biological specimens, aqueous detergent solutions, and hydrocarbons (e.g., alkanes, isoalkanes and aromatic compounds such as xylene). Still further examples of fluids include solvents (and mixtures thereof) used to dehydrate or rehydrate biological specimens.

As used herein, the term "plurality" refers to two or more, for example, 3 or more, 4 or more, 5 or more, etc.

As used herein, the terms "reagent" refers to any liquid or liquid composition used in a specimen processing operation that involves adding liquid or liquid composition to a slide. Examples of reagents and processing liquids include solutions, emulsions, suspensions, and solvents (either pure or mixtures thereof). These and other examples can be aqueous or non-aqueous. Further examples include solutions or suspensions of specific-binding entities, antibodies, solutions or suspensions of nucleic acid probes, and solutions or suspensions of dye or stain molecules (e.g., H&E staining solutions, Pap staining solutions, etc.). Still further examples include solvents and/or solutions for deparaffinizing paraffin-embedded biological specimens, aqueous detergent solutions, and hydrocarbons (e.g., alkanes, isoalkanes and aromatic compounds such as xylene).

As used herein, the term "primary antibody" refers to an antibody which binds specifically to a target protein antigen in a tissue sample. A primary antibody is generally the first antibody used in an immunohistochemical procedure. Epitope-tagged antibodies, unmodified antibodies, or antibody conjugates, each described herein, are examples of primary antibodies. Primary antibodies may thus serve as "detection probes" for detecting a target within a tissue sample.

As used herein, the term "secondary antibody" herein refers to an antibody which binds specifically to a detection probe or portion thereof (e.g. a hapten or a primary antibody), thereby forming a bridge between the detection probe and a subsequent reagent (e.g. a label, an enzyme, etc.), if any. A secondary antibody may be used to indirectly detect detection probes, e.g. primary antibodies. Examples of secondary antibodies include anti-tag antibodies, anti-species antibodies, and anti-label antibodies, each described herein.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

As used herein, the term "specific binding entity" refers to a member of a specific-binding pair. Specific binding pairs are pairs of molecules that are characterized in that they bind each other to the substantial exclusion of binding to other molecules (for example, specific binding pairs can have a binding constant that is at least 103 M−1 greater, 104 M−1 greater or 105 M−1 greater than a binding constant for either of the two members of the binding pair with other molecules in a biological sample). Particular examples of specific binding moieties include specific binding proteins (for example, antibodies, lectins, avidins such as streptavidins, and protein A). Specific binding moieties can also include the molecules (or portions thereof) that are specifically bound by such specific binding proteins. Specific binding entities include primary antibodies, described above, or nucleic acid probes.

As used herein, the terms "stain," "staining," or the like as used herein generally refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures, and organisms not only with bright-field microscopes, but also with other viewing tools, such as phase contrast microscopes, electron microscopes, and fluorescence microscopes. Some staining performed by the system 2 can be used to visualize an outline of a cell. Other staining performed by the system 2 may rely on certain cell components (such as molecules or structures) being stained without or with relatively little staining other cell components. Examples of types of staining methods performed by the system 2 include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH).

As used herein, the term "substantially" means the qualitative condition of exhibiting total or near-total extent or degree of a characteristic or property of interest. One of ordinary skill in the art will understand that biological and chemical phenomena rarely, if ever, go to completion and/or proceed to completeness or achieve or avoid an absolute result. In some embodiments, "substantially" means within about 20%. In some embodiments, "substantially" means within about 15%. In some embodiments, "substantially" means within about 10%. In some embodiments, "substantially" means within about 5%.

As used herein, "target" means any molecule for which the presence, location and/or concentration is or can be determined. Examples of targets include nucleic acid sequences and proteins, such as those disclosed herein.

As used herein, the term "transducer" refers to any device that can convert a first energy type, such as electrical energy, into acoustic, sonic or vibrational energy. Typically, the first energy type is electrical, electromagnetic or electrostatic energy. Transducers may be of any type including single-element, multi-element, arrays, mechanically focused, acoustically lensed, mechanically unfocused, mechanically collimated, mechanically defocused, mechanically scanned, electronically scanned, etc.

As used herein, the abbreviation "Vpp" means peak-to-peak voltage.

Devices and Systems

Without wishing to be bound by any particular theory, it is believed that non-contact on-slide distribution, replenishment, and/or mixing of the fluids on the microscope slide may improve stain quality, reduce total assay time, require lower concentrations of reagents (e.g. antibodies) saving cost, and eliminate cross-contamination risk. With this in mind, one aspect of the present disclosure is a microscope slide holder comprising a slide support member and at least one acoustic source for introducing acoustic waves to a microscope slide in communication with the slide support member such that one or more fluids present on the surface of the microscope slide are contactlessly mixed. In some embodiments, the microscope slide comprises a biological sample comprising cells and/or tissue and mixing by means of the acoustic waves occurs without damaging the cells and/or tissue within the sample. In some embodiments, mixing occurs without substantially increasing the temperature of any fluid present on the surface of the microscope slide and/or without increasing the temperature of the sample (e.g. without increasing the temperature of the fluid or sample by more than 10 degrees).

In some embodiments, the acoustic waves are generated with an acoustic source. In some embodiments, the acoustic source is a transducer. In some embodiments, the transducer is a mechanical transducer. In other embodiments, the transducer is a piezoelectric transducer. In some embodiments, the transducer is composed of a piezoelectric wafer that generates a mechanical vibration. In some embodiments, the transducer operates in a single axis, i.e. a unidirectionally radiating transducer which only generates surface sound waves in a single direction, e.g. along a y-axis. In other embodiments, the transducer operates in multiple directions, e.g. along x- and y-axes.

In some embodiments, a surface transducer is used to distribute or mix a fluid volume on-slide. Without wishing to be bound by any particular theory, it is believed that low frequency acoustic waves generated by the surface transducer are radiated through a material assembly (such as described herein) to a fluid volume on-slide to distribute and/or mix the solution. In some embodiments, an electromagnet, driven by a signal generator, moves the surface transducer up/down (e.g. between 0.1 mm to about 3 mm). More particularly, the surface transducer converts an input frequency and voltage into a vertical diaphragm displacement via an electro-magnet. The oscillations of the transducer diaphragm propagate through the slide fixture and distribute and/or mix the fluid on the slide.

In some embodiments, the acoustic source is a surface transducer having a diameter of between about 5 mm to about 60 mm. In other embodiments, the acoustic source is a surface transducer having a diameter of between about 10 mm to about 50 mm. In yet other embodiments, the acoustic source is a surface transducer having a diameter of between about 20 mm to about 50 mm.

In some embodiments, the acoustic source operates at a frequency ranging from between about 0.5 Hz to about 2000 Hz. In some embodiments, the acoustic source operates at a frequency ranging from between about 0.5 Hz to about 1000 Hz. In some embodiments, the acoustic source operates at a frequency ranging from between about 1 Hz to about 1000 Hz. In some embodiments, the acoustic source operates at a frequency ranging from between about 1 Hz to about 750 Hz. In some embodiments, the acoustic source operates at a frequency ranging from between about 1 Hz to about 500 Hz. In some embodiments, the acoustic source operates at a frequency ranging from between about 1 Hz to about 250 Hz. In some embodiments, the acoustic source operates at a frequency ranging from between about 1 Hz to about 200 Hz. In some embodiments, the acoustic source operates at a frequency ranging from between about 1 Hz to about 150 Hz. In some embodiments, the acoustic source operates at a frequency ranging from between about 10 Hz to about 200 Hz. In some embodiments, the acoustic source operates at a frequency ranging from between about 50 Hz to about 200 Hz. In some embodiments, the acoustic source operates at a frequency ranging from between about 100 Hz to about 200 Hz. In some embodiments, the acoustic source operates at a frequency of about 150 Hz.

In some embodiments, the frequency used in certain embodiments of the present disclosure also will be influenced by the energy absorption characteristics of the sample or of the support member, for a particular frequency. To the extent that a particular frequency is better absorbed or preferentially absorbed by the sample, it may be preferred to better influence the acoustic wave's effect on mixing. In some embodiments, the acoustic waves can be delivered in the form of short pulses or as a continuous field for a defined length of time. In some embodiments, the pulses can be bundled or regularly spaced.

In some embodiments, the acoustic source may operate for a first period of time at a first frequency, and then operate for a second period of time at a second frequency. In other embodiments, the acoustic source may operate initially at a first frequency the frequency may be increased or decreased over time (e.g. ramped up or ramped down over time at a predetermined interval). For example, a first frequency may be 100 Hz and a second frequency may be 200 Hz, and the frequency may be ramped from 100 Hz in 10 Hz intervals every 0.5 seconds until the 200 Hz frequency is attained. In other embodiments, the acoustic source employs frequency modulation, whereby the frequency is deviated by a value which is +/−20% of a predetermined frequency value. For example, an acoustic source operating at 100 Hz may have its frequency deviate by +/−10 Hz. In other embodiments, the acoustic source may simultaneously operate at multiple frequencies, each of which may be modulated.

In embodiments where multiple acoustic sources are utilized, each acoustic source may operate at the same frequency (or range of frequencies) or at a different frequency (or range of different frequencies). In embodiments where multiple acoustic sources are utilized, each acoustic source may operate during different times periods. For example, a first acoustic source may operate for a first time period, followed by operation of a second acoustic source for a second time period (where both time periods can be at the same frequency or at different frequencies).

In embodiments where multiple acoustic sources are utilized, each acoustic source may operate in phase or out-of-phase with each other. The skilled artisan will appreciate that by operating multiple acoustic sources, each acoustic source may be tuned to operate in an out-of-phase manner such that the acoustic waves generated by the acoustic sources will not cancel each other out, thereby permitting efficient mixing of the one or more fluids present on the surface of the microscope slide. The skilled artisan will also appreciate that the frequency of each of the transducers may be modulated throughout their operation.

In some embodiments, an input amplitude ranges from about 0.1 to about 1,000 mVpp. In other embodiments, the input amplitude ranges from about 40 to about 350 mVpp. In some embodiments, an input amplitude may be modulated over time. For example, an acoustic source may initially operate at a first amplitude and the amplitude may be increased or ramped-up over time until a final amplitude is reached. In some embodiments, the amplitude is increased by a predetermined amount over a predetermined amount of time. In some embodiments, an input amplitude is selected such that fluids present on the slide are retained, i.e. are not displaced from the slide.

Figure 1C:
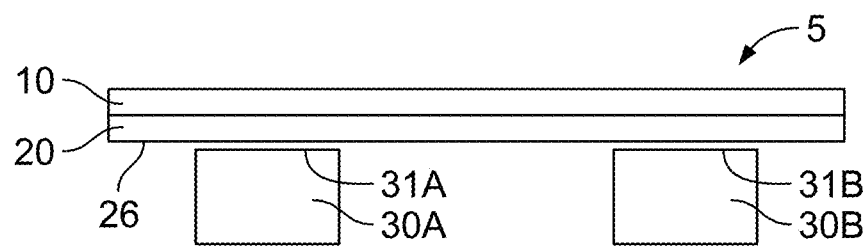
FIG. 1C provides a side view of a microscope slide holder in communication with a plurality of transducers.
Figure 1D:
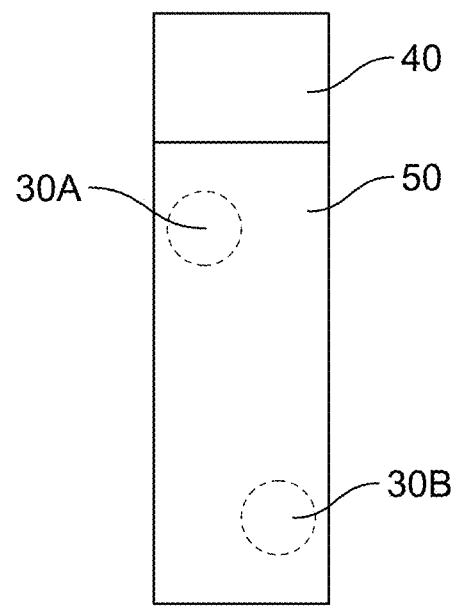
FIG. 1D provides a top view of a microscope slide holder in communication with a plurality of transducers.

FIG. 1A depicts a slide holder 5 having a slide support member 20 configured to support at least a portion of a back surface of microscope slide 10. In some embodiments, such as depicted in FIG. 1A, the slide support member 20 is substantially the same size as a microscope slide 10. Of course, the skilled artisan will appreciate that the slide support member 20 may be larger or smaller than the microscope slide 10 in any dimension. For example, and as depicted in FIG. 1F, the slide support member 20 is larger than the microscope slide 10; while in FIG. 1G, the slide support member 20 (dotted lines) is depicted as being smaller than the microscope slide 10. In some embodiments, the support member has a thickness which ranges from about 0.1 mm to about 20 mm.

In some embodiments, the support member 20 is constructed of a material that permits the radiation of, conduction of and/or transfer of acoustic waves from the acoustic source 30, through the support surface 20, and to the specimen or fluid located on slide 10. For example, the support member may be constructed of a metal (e.g. copper, aluminum, brass, chromium, silver, gold, platinum, and titanium, or alloys comprising any of the above identified metals.

Figure 5A:
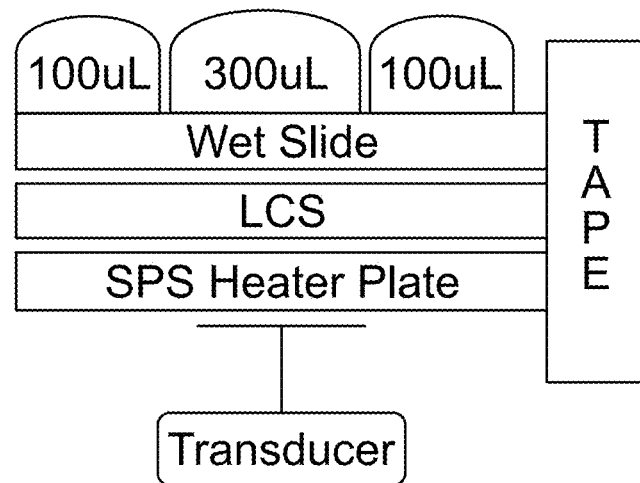
FIG. 5A provides a side view of a microscope slide holder in communication with a transducer, the slide holder also including a heater plate.

In some embodiments, the support member 20 comprises a heating element or other means for heating the microscope slide 10. In some embodiments, the support member 20 is a heater plate, such as depicted in FIG. 5A. In some embodiments, the support member 20 comprises a cooling element or other means of removing heat from the microscope slide 10. In other embodiments, a thermal regulation plate comprising elements for heating or cooling the microscope slide is disposed between the support member 20 and the microscope slide 10.

In some embodiments, the slide holder 5 comprises one or more retaining members 22, such as springs, clips or tabs, to releasably secure the microscope slide 10 to the slide support member 20. In some embodiments, the retaining members 22 limit the axial, lateral, and vertical movements of the slide 10 once the slide is loaded onto the support member 20.

In some embodiments, the acoustic source 30 (or a top surface 31, thereof) is in communication with the slide support member 20. In some embodiments, the acoustic source 30 is in contact with a bottom surface 27 of the slide support member 20 (see FIGS. 1A-1G). In some embodiments, the acoustic source 30 is only in contact while the acoustic source is operating. In some embodiments, the acoustic source moves up and down and contacts the slide support when operating. In other embodiments, the transducer is at least partially embedded within the slide support member 20, e.g. integrated into the slide support member 20 such that the slide support and transducer comprise a single element.

Figure 1E:
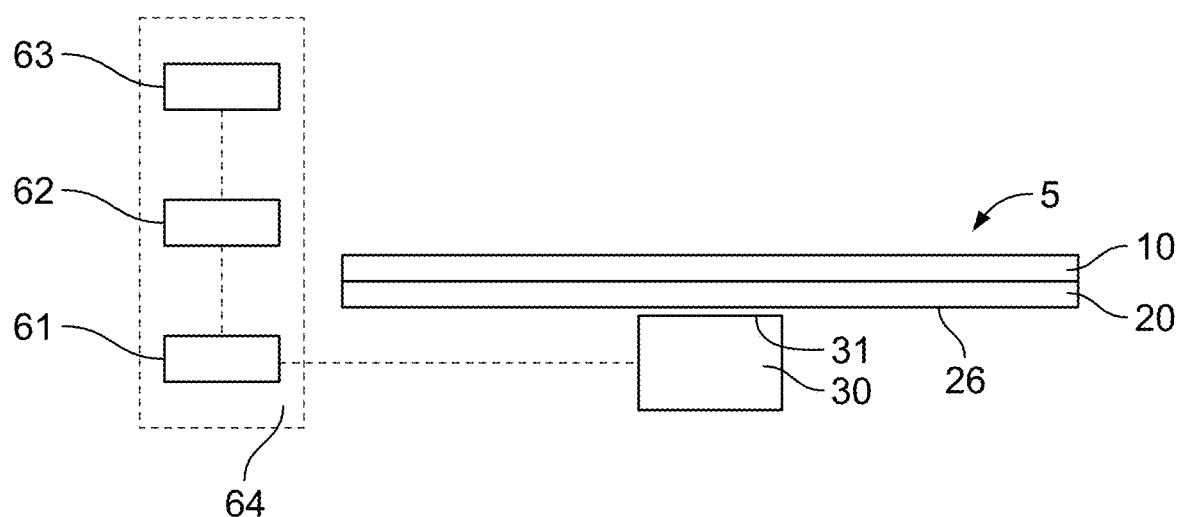
FIG. 1E provides a side view of a microscope slide holder in communication with a transducer.
Figure 1F:
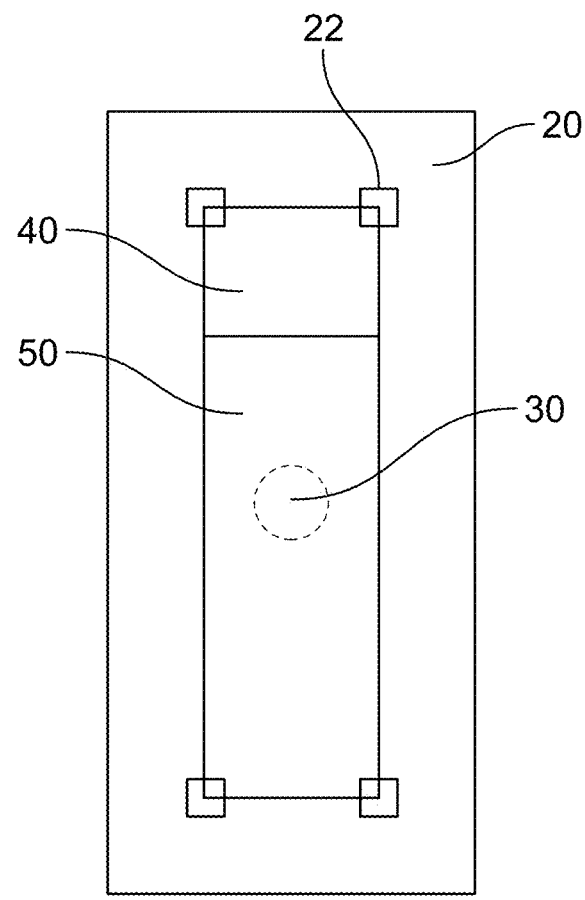
FIG. 1F provides a top view of a microscope slide holder in communication with a transducer, wherein the support member is larger in at least one dimension compared to the microscope slide.
Figure 1G:
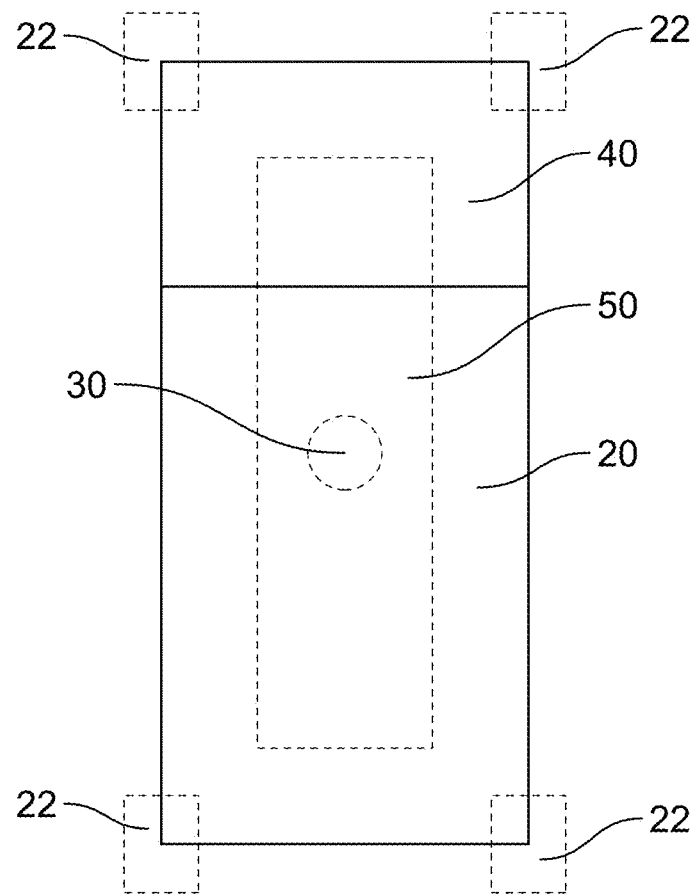
FIG. 1G provides a top view of a microscope slide holder in communication with a transducer, wherein the support member is smaller in at least one dimension compared to the microscope slide.
Figure 1H:
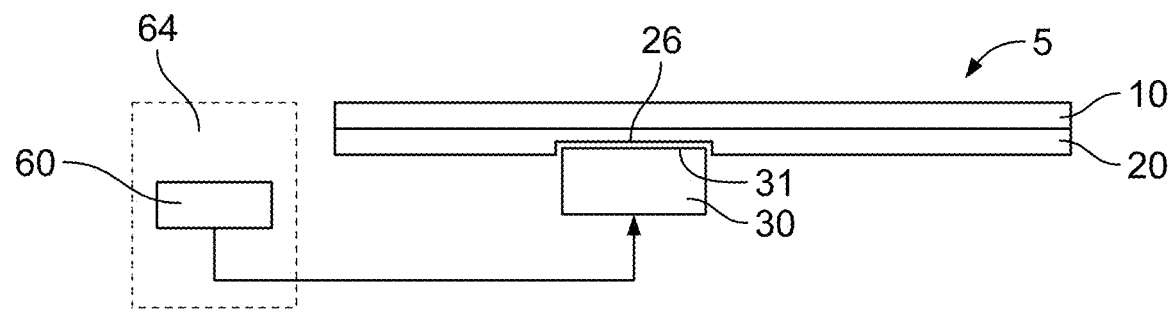
FIG. 1H provides a side view of a microscope slide holder in communication with a transducer.
Figure 1I:
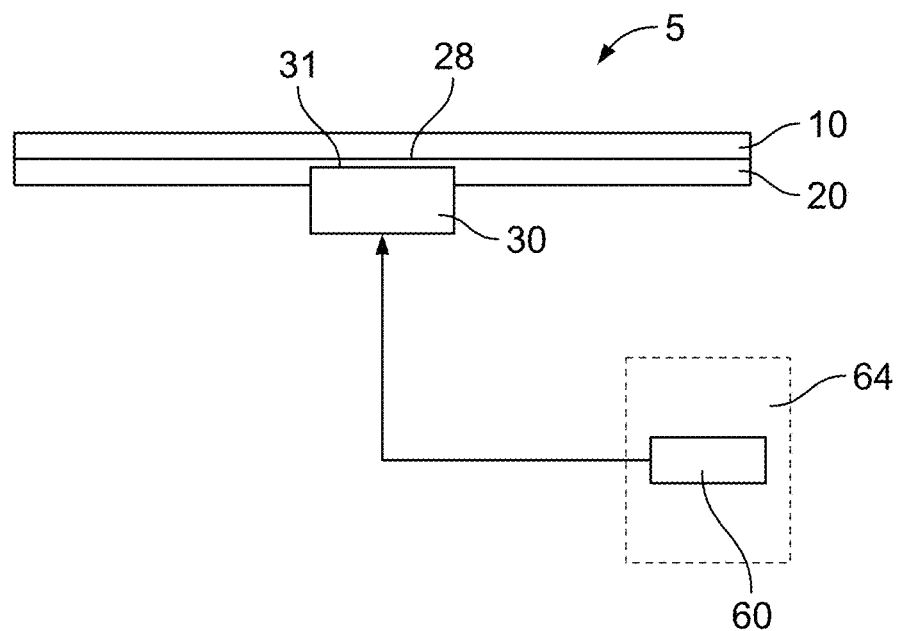
FIG. 1I provides a side view of a microscope slide holder in communication with a transducer.
Figure 1J:
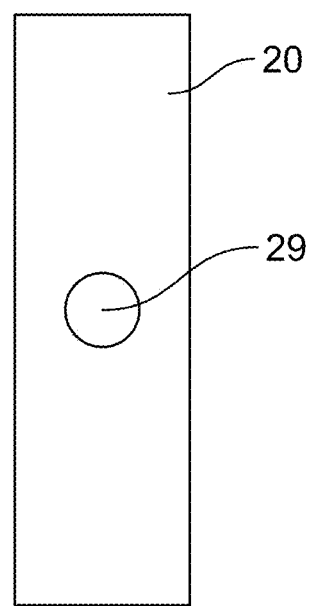
FIG. 1J provides a top view of a microscope slide holder in communication with a transducer.

In other embodiments, the acoustic source (or a top of the acoustic source) is recessed within the slide support member 20 but still in communication with the bottom surface 26 of the support member 20 (see FIG. 1H). In yet other embodiments, the transducer is in direct communication with the slide. For example, the acoustic source (or a top of the acoustic source) may be recessed within the slide support member 20 and in direct communication with the bottom surface 28 of the microscope slide 10 (see FIG. 1I). FIG. 1K illustrates a support member 20 comprising a cavity 29 for insertion of an appropriately sized acoustic source.

In some embodiments, the support member 20 is in communication with a single transducer 30 as illustrated in FIGS. 1A, 1E, and 1F. In other embodiments, the support member may be in communication with a plurality of transducers. For example, FIG. 1C illustrates a slide support member 20 in communication with two transducers 30A and 30B. Of course, the skilled artisan will appreciate that any number of transducers may be in communication with the slide support member 20. Regardless of the number of transducers incorporated, the skilled artisan will appreciate that one or more transducers are configured such that acoustic waves, e.g. surface sound waves, generated are permitted to radiate to the microscope slide 10 and configured to effect mixing of the fluid.

The skilled artisan will appreciate that the transducer 30 may be placed at any position relative to the microscope slide 10. In some embodiments, a microscope slide 10 comprises a label end 40 and a specimen-bearing end 50, and the transducer is placed in within the confines of the specimen-bearing end 50. In some embodiments, the transducer 30 is placed at a position which approximates a center of the specimen-bearing end 50 (see FIG. 1B). In other embodiments, the transducer is placed at a position along the slide 10 where the majority of a fluid will be dispensed. In some embodiments, the transducer is placed at least 1 cm from an end of the microscope slide. In some embodiments, the transducer is placed at least 1.5 cm from an end of the microscope slide. In other embodiments, the transducer is placed about 1 cm from the label end of the slide.

In embodiments having a plurality of transducers, the transducers may be placed at any position relative to the slide. In some embodiments, and as illustrated in FIG. 1C, the transducers 30A and 30B may be placed at opposite ends of the support member 20. In other embodiments, and as illustrated in FIG. 1D, the tops 31A and 31B of two transducers are positioned at opposite corners of the specimen-bearing end 50 of slide 10. In embodiments where a plurality of transducers are provided, the transducers may be spaced between 0.1 cm and 10 cm from each other.

While FIGS. 1A and 1C illustrate a transducer 30 have a top surface 31 within a plane substantially parallel to the plane of the support member 20 or slide 10, the skilled artisan will appreciate that the top surface 31 may be offset at any angle relative to the support member 20 or slide 10.

In some embodiments, the one or more acoustic sources in communication with the microscope slide are surface transducers, whereby a surface area of the transducers in the aggregate is at least about 5% of the surface area of a microscope slide. In other embodiments, the one or more acoustic sources in communication with the microscope slide are surface transducers, whereby a surface area of the transducers in the aggregate is at least about 10% of the surface area of a microscope slide. In yet other embodiments, the one or more acoustic sources in communication with the microscope slide are surface transducers, whereby a surface area of the transducers in the aggregate is at least about 15% of the surface area of a microscope slide. In further embodiments, the one or more acoustic sources in communication with the microscope slide are surface transducers, whereby a surface area of the transducers in the aggregate is at least about 20% of the surface area of a microscope slide.

In some embodiments, the acoustic source is movable with respect to the microscope slide (e.g. with a stepper motor). For example, the acoustic source may be moved from a first position to a second position (either along the x-axis, y-axis, or both) relative to the microscope slide 10 such that the acoustic waves are introduced along various portions of the microscope slide. The skilled artisan will appreciate that the movement of the acoustic source during its operation may facilitate uniform mixing of the fluids on the surface of the microscope slide. The skilled artisan will also appreciate the acoustic source may be repositioned depending on where a specimen and/or fluid are provided on the surface of the microscope slide. In other embodiments, the acoustic source may be moved along the z-axis relative to the support member, so as to accommodate different support members, acoustically conductive substrates, to enhance contact with the support member, etc.

In other embodiments, the microscope slide is movable with respect to the acoustic source. For example, a microscope slide may be moved from a first position to a second position on a slide tray. For example, the first position may be a dispensing station such that the slide receives one or more fluids; and the second position may be a fluid distribution or mixing station having an acoustic source transducer to distribute, replenish, and/or mix the dispensed one or more fluids (as described further herein).

Figure 2A:
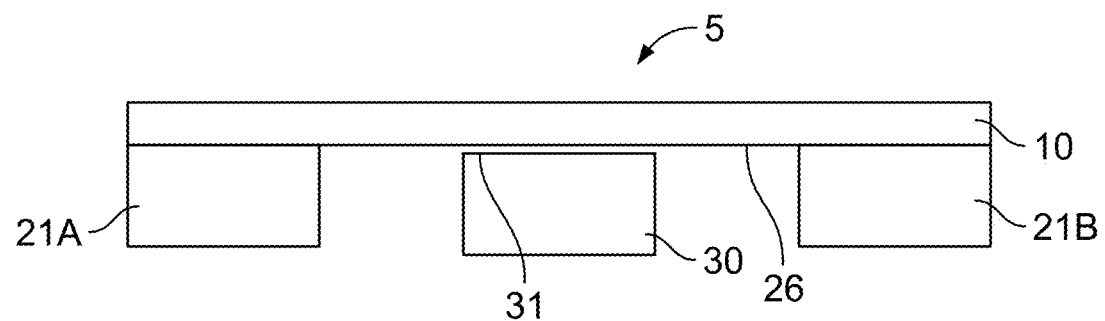
FIGS. 2A and 2B provide side views of a microscope slide holder in communication with a transducer.
Figure 2B:
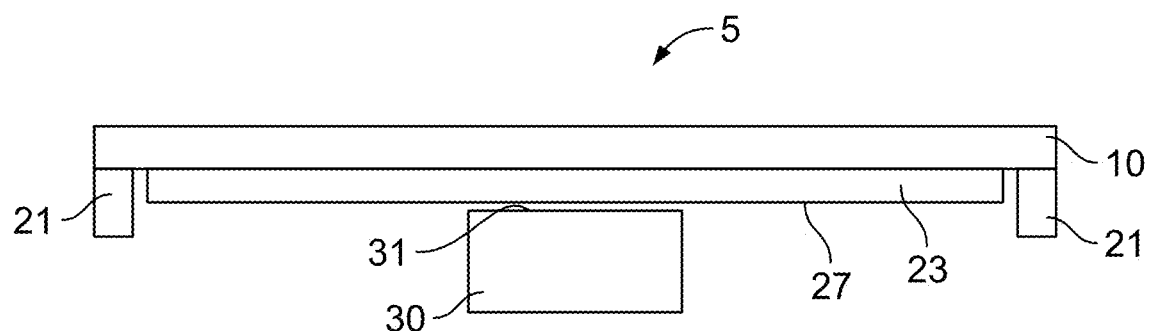
Figure 2C:
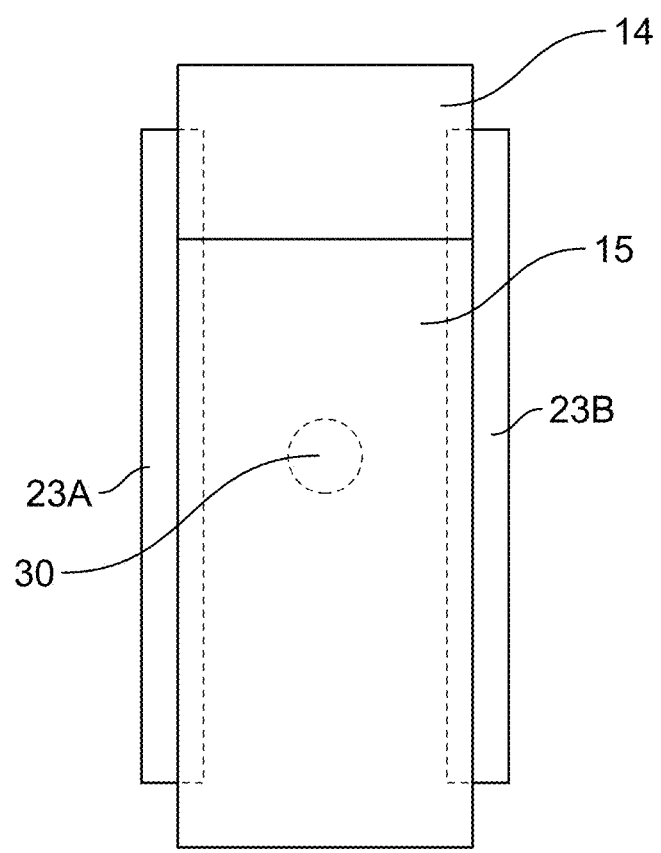
FIG. 2C provides a top view of a microscope slide holder in communication with a transducer.

In other embodiments, the slide holder 5 may comprise a plurality of support members 21. FIGS. 2A and 2B depict a microscope slide 10 which is supported by support members 21A and 21B located at each end of slide 10. Alternatively, the microscope slide 10 may be supported by rails (not depicted) which run substantially along the longitudinal edges of the slide as shown in FIG. 2C. In these embodiments, the transducer 30, or a top surface 31 thereof, may be in direct communication with the bottom surface 28 of microscope slide 10.

Alternatively, the transducer 30, or a top surface 31 thereof, may be in indirect communication with the microscope slide 10. For example, a conductive material 23 may be placed between the microscope slide 10 and transducer 30 so as to enhance or distribute the acoustic waves supplied to the microscope slide (whereby the transducer will be in communication with a bottom surface 27 of the conduct material 23). In some embodiments, the conductive material 23 is a substrate (e.g. a disposable substrate) having an outer shell and comprising water, a liquid, a gel, a hydrogel within the confines of the shell. In other embodiments, the conductive material 23 may be a liquid or gel placed between the slide 10 and the acoustic source 30. In yet other embodiments, the conductive material is an acoustically conductive solid material.

Figure 4A:
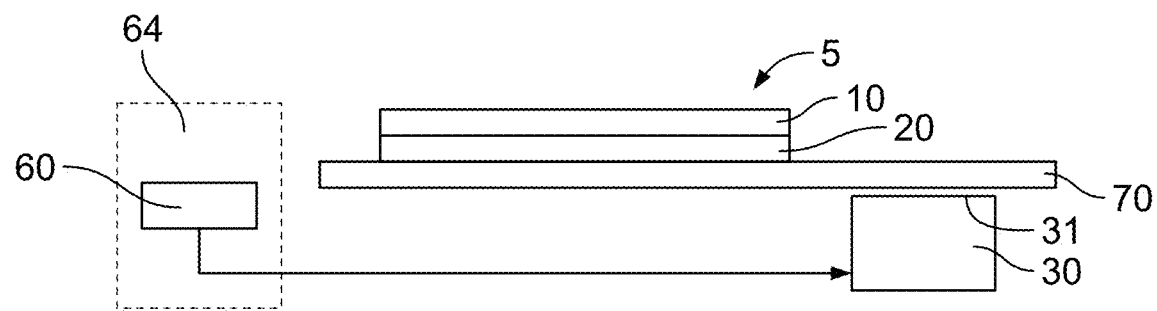
FIG. 4A provides a side view of a microscope slide holder in communication with a transducer, the slide holder including a cantilever arm.
Figure 4B:
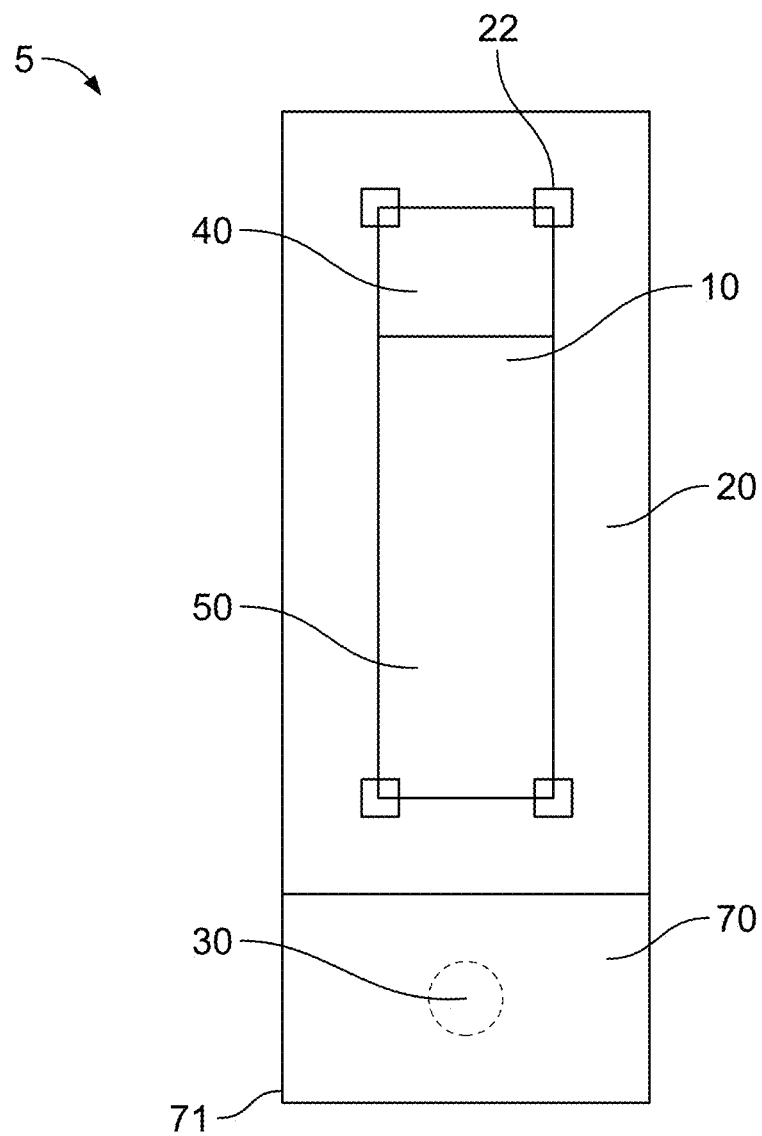
FIG. 4B provides a top view of a microscope slide holder in communication with a transducer, the slide holder including a cantilever arm.

In other embodiments, and with reference to FIGS. 4A and 4B, the slide holder includes a support member 20 positioned between a microscope slide 10 and a cantilever arm 70. In these embodiments, the cantilever arm comprises at least a distal portion 71 that is in communication with the acoustic source 30. In some embodiments, neither the support member 20 nor the microscope slide 10 are positioned above the distal portion 71. In some embodiments, a single acoustic source 30 is placed within the confines of the distal portion 71. In other embodiments, a plurality of acoustic sources 30 are placed within the confines of the distal portion 71, and each of the plurality of acoustic sources 30 may be spaced or arranged from each other in any manner. In yet other embodiments, one or more acoustic sources 30 are placed within the confines of the distal portion 71, and at least one additional acoustic source 30 is placed in communication with the cantilever arm 70 at a position under the support member 20.

In some embodiments, the distal portion 70 extends from the support member 20 by at least 1 inch. In other embodiments, the distal portion 70 extends from the support member 20 by at least 2 inches. In yet other embodiments, the distal portion 70 extends from the support member 20 by at least 3 inches. In other embodiments, the distal portion 70 extends from the support member 20 by at least 4 inches.

In some embodiments, the cantilever arm 70 is constructed from a material selected from the group consisting of plastics (e.g. polyethylene terephthalate (PET), high-density polyethylene (HDPE), polypropylene (PP), and low-density polyethylene (LDPE) and metals (aluminum, copper, stainless steel, etc.).

Figure 4C:
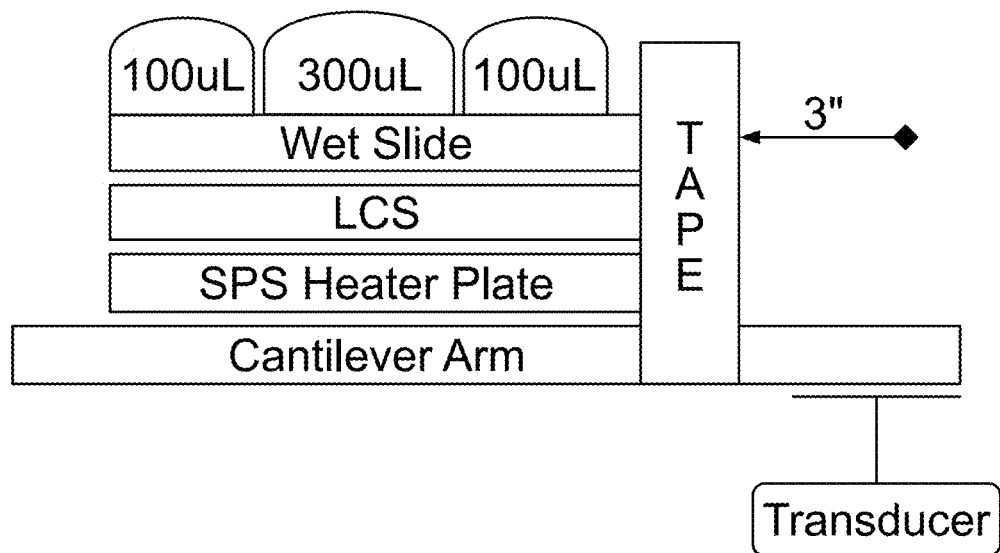
FIG. 4C provides a side view of a microscope slide holder in communication with a transducer, the slide holder including a cantilever arm and also including a heater plate.

In other embodiments, and with reference to FIG. 4C, the slide holder includes a support member 20 positioned between a microscope slide 10 and a cantilever arm 70, wherein a fluid (e.g. LCS (Liquid Cover Slip), Ventana Medical Systems, Inc., Tucson, Ariz., USA) is positioned between the support member 20 (identified as a heater plate) and the slide 10. In some embodiments, the surface of the microscope slide may comprise a plurality of individual puddles separately dispensed onto the surface of the slide, and whereby the acoustic source 30 enables distribution and/or mixing of those discrete fluids.

In some embodiments, the acoustic source may be coupled to an arm (or other like member), whereby the arm may be moved such that the acoustic source coupled to the arm may be positioned to contact the support member or the slide, thereby introducing low frequency acoustic waves to the slide or specimen thereon.

Slide Trays

With reference to FIG. 3, the present disclosure also contemplates slide trays 100 configured to hold a plurality of microscope slides 10, where each individual microscope slide 10 within the tray 100 is held at a discrete horizontal position relative to an adjacent slide (but in the same plane), and where each individual microscope slide 10 is in communication with an acoustic source 30 to enable contactless mixing of one or more fluids present on the microscope slide. In some embodiments, each position within the slide tray may comprise a slide holder having an acoustic source, such as those illustrated in any of FIG. 1A-1G, 2A-2C, 4A-4C, 5A-5B or 6. Indeed, each position within the slide tray may comprise a slide support member, one or more retention members, and at least one acoustic source, as described above. Suitable slide trays may have any suitable shape, and the microscope slides held in a given slide tray can be arranged in any suitable manner to hold any suitable number of slides, for example, 5 or more slides, 10 or more slides, 20 or more slides, or 30 or more slides. Several examples of slide trays of different shapes and holding capacities are disclosed in U.S. Pat. No. 7,468,161, which is incorporated by reference in its entirety.

In some embodiments, the slide trays are generally rectangular trays configured to hold two rows of slides that are held side-by-side on both sides of the central long axis of the slide tray so that the long dimensions of the slides are disposed outward from the long central axis of the tray. Each acoustic source 30 within the slide tray 100 may be communicatively coupled to a controller 60. In some embodiments, materials may be placed between each adjacent microscope slide or adjacent support member within the slide tray to reduce the amount of acoustic energy transmitted between adjacent slide holders, i.e. to prevent or mitigate the transmission of acoustic waves from a first transducer at a first position to a microscope slide at a second position adjacent to the first position.

Automated Slide Processing Systems

In another aspect of the present disclosure is an automated slide processing apparatus comprising at least one fluid dispenser configured to dispense a fluid onto a slide, and a slide holder or a slide tray comprising at least one acoustic source for contactless mixing, as described herein. Of course, the skilled artisan will appreciate that slide trays, such as those noted above, incorporating acoustic sources may be utilized in the staining systems and the specimen processing apparatus described in U.S. Pat. Nos. 8,663,991; 8,048,373; and 7,468,161; and U.S. Patent Publication No. 2016/0282239, the disclosures of each are hereby incorporated by reference herein in their entireties.

In some embodiments, specimen processing apparatus, incorporating the slide holders or slide trays described herein, is an automated apparatus, such as the BENCHMARK XT instrument, the SYMPHONY instrument, the BENCHMARK ULTRA instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

Examples of commercially available H&E stainers include the VENTANA SYMPHONY (individual slide stainer) and VENTANA HE 600 (individual slide stainer)

series H&E stainers from Roche; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH.

The specimen processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation). The acoustic source in communication with the microscope slide may be used to uniformly distribute any of these fixatives the slide or within another fluid, as detailed herein.

If the specimen is a sample embedded in paraffin, the sample can be deparaffinized with the specimen processing apparatus using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like. Again, any of these substances applied may be mixed or distributed through use of the acoustic source.

The specimen processing apparatus can apply a wide range of substances to the specimen, which may then be uniformly distributed and/or mixed using the acoustic source in communication with the slide holder. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label. Labels can include radioactive isotopes, enzyme substrates, cofactors, ligands, chemiluminescent or fluorescent agents, haptens, and enzymes.

Automated IHC/ISH slide stainers typically include at least: reservoirs of the various reagents used in the staining protocols, a reagent dispense unit in fluid communication with the reservoirs for dispensing reagent to onto a slide, a waste removal system for removing used reagents and other waste from the slide, and a control system that coordinates the actions of the reagent dispense unit and waste removal system. In addition to performing staining steps, many automated slide stainers can also perform steps ancillary to staining (or are compatible with separate systems that perform such ancillary steps), including: slide baking (for adhering the sample to the slide), dewaxing (also referred to as deparaffinization), antigen retrieval, counterstaining, dehydration and clearing, and coverslipping. Prichard, Overview of Automated Immunohistochemistry, Arch Pathol Lab Med., Vol. 138, pp. 1578-1582 (2014), incorporated herein by reference in its entirety, describes several specific examples of automated IHC/ISH slide stainers and their various features, including the intelliPATH (Biocare Medical), WAVE (Celerus Diagnostics), DAKO OMNIS and DAKO AUTOSTAINER LINK 48 (Agilent Technologies), BENCHMARK (Ventana Medical Systems, Inc.), Leica BOND, and Lab Vision Autostainer (Thermo Scientific) automated slide stainers. Additionally, Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety.

Commercially-available staining units typically operate on one of the following principles: (1) open individual slide staining, in which slides are positioned horizontally and reagents are dispensed as a puddle on the surface of the slide containing a tissue sample (such as implemented on the DAKO AUTOSTAINER Link 48 (Agilent Technologies) and intelliPATH (Biocare Medical) stainers); (2) liquid overlay technology, in which reagents are either covered with or dispensed through an inert fluid layer deposited over the sample (such as implemented on VENTANA BenchMark and DISCOVERY stainers); (3) capillary gap staining, in which the slide surface is placed in proximity to another surface (which may be another slide or a coverplate) to create a narrow gap, through which capillary forces draw up and keep liquid reagents in contact with the samples (such as the staining principles used by DAKO TECHMATE, Leica BOND, and DAKO OMNIS stainers). Some iterations of capillary gap staining do not mix the fluids in the gap (such as on the DAKO TECHMATE and the Leica BOND). In variations of capillary gap staining termed dynamic gap staining, capillary forces are used to apply sample to the slide, and then the parallel surfaces are translated relative to one another to agitate the reagents during incubation to effect reagent mixing (such as the staining principles implemented on DAKO OMNIS slide stainers (Agilent)). In translating gap staining, a translatable head is positioned over the slide. A lower surface of the head is spaced apart from the slide by a first gap sufficiently small to allow a meniscus of liquid to form from liquid on the slide during translation of the slide. A mixing extension having a lateral dimension less than the width of a slide extends from the lower surface of the translatable head to define a second gap smaller than the first gap between the mixing extension and the slide. During translation of the head, the lateral dimension of the mixing extension is sufficient to generate lateral movement in the liquid on the slide in a direction generally extending from the second gap to the first gap. See WO 2011-139978 A1. It has recently been proposed to use inkjet technology to deposit reagents on slides. See WO 2016-170008 A1. This list of staining technologies is not intended to be comprehensive, and any of the slide holders or slide trays incorporating acoustic mixing means may be used in conjunction with such systems to effectuate distribution and mixing of staining reagents.

In some embodiments is an apparatus for automatically treating biological specimens, comprising: at least one slide tray (such as described herein) holding a plurality of slides in substantially horizontal positions, wherein the biological specimens are located on the slides, wherein each of the plurality of slides in communication with at least one acoustic source so as to permit the introduction of acoustic waves to the slide and/or sample; one or more workstations that receive the slide tray and perform one or more slide processing operations on the plurality of slides held in the slide tray; a transporter that moves the slide tray into and out of the one or more workstations; a fluidics module in fluid communication with the one or more workstations that supplies a reagent to the one or more workstations; a pneumatics module in fluid communication with the one or more workstations and the fluidics module; wherein the pneumatics module supplies vacuum and/or pressurized gas to the one or more workstations and the fluidics module; and a control module in electrical communication with the transporter, the one or more workstations, the fluidics module and the pneumatics module, wherein the control module coordinates function of components (including the acoustic source) of the apparatus during treatment of the biological specimens.

In some embodiments, the apparatus for automatically treating biological specimens further comprises a control system for independently controlling each acoustic source so as to independently vary the operating parameters of the acoustic source, the controller including at least a signal generator. In some embodiments, the apparatus for automatically treating biological specimens further comprises one or more sensors or other feedback mechanisms to enable monitoring of the mixing and/or distribution of the fluids dispensed onto the surface of the slide. In some embodiments, the control system comprises a microprocessor and one or more microcontrollers, wherein the one or more microcontrollers receive instructions from the microprocessor and separately control one or more of the one or more workstations, the fluidics module, the one or more acoustic sources, and/or the transporter. In some embodiments, the slide tray comprises a plurality of slide holders, such as the slide holders described herein or as illustrated in FIGS. 1A through 1G.

In some embodiments, the at least one of the workstations comprises a moveable nozzle assembly, wherein the nozzle assembly includes one or more nozzles through which the reagent is delivered to a slide. The nozzles may be dispense nozzles or rise nozzles.

In some embodiments, the workstation can perform a slide processing operation on one or more individual slides in a slide tray, for example, at least two or four slides in a slide tray, or it can simultaneously perform a slide processing operation (including mixing operations with the acoustic source) on all of the slides in a slide tray. In some embodiments, one or more workstations dispense a reagent to slides in the slide tray without a substantial amount of the reagent that contacts a first slide contacting a second slide, thereby minimizing cross-contamination between slides. Such workstations can include one or more directional nozzles that dispense the reagent onto the slides, for example, the one or more directional nozzles can include a pair of directional nozzles that dispense the reagent in opposite directions across a surface of a slide. In more particular embodiments, the one or more directional nozzles can further include a directional nozzle that dispenses the reagent towards a bottom surface of a slide. In other embodiments, the one or more workstations can simultaneously dispense a reagent (for example, the same reagent) to at least two slides held in a slide tray within a given workstation, or the one or more workstations can simultaneously dispense a reagent (such as the same reagent) to all of the slides held in the slide tray within a given workstation. Following dispensing of the fluids and or reagents, the acoustic source may be activated to distribute and/or mix the fluids on the surface of the slide.

In some embodiments is an automated method for processing a plurality of slides bearing biological tissue samples, comprising: performing a set of slide processing operations on the plurality of slides in one or more workstations while the slides in the plurality are held in spatially co-planar, substantially horizontal positions in a slide tray, wherein each of the plurality of slides are in communication with at least one acoustic source so as to permit the introduction of acoustic waves to the slide and/or sample, wherein the set of slide processing operations includes at least staining samples on the slides in the spatially co-planar, substantially horizontal positions by flowing one or more stains from at least one reagent container, through a fluidics module, and out at least one dispense nozzle positioned above the slide tray, and solvent-exchanging; transporting the slide tray holding the plurality of slides to an automated coverslipper workstation after performing the set of slide processing operations that include at least staining and solvent-exchange; coverslipping the plurality of slides held in the slide tray with separate respective coverslips using the automated coverslipper workstation while the plurality of slides are held in spatially co-planar, substantially horizontal positions in the slide tray such that the coverslips on the slides are spaced apart from one another; and removing the slide tray holding the coverslipped slides from the automated coverslipper workstation. In some embodiments, processing includes the steps of (i) baking the samples under a radiant heater; (ii) de-paraffinizing the samples; (iii) staining the samples by delivering one or more stains through one or more fluidic components and out one or more nozzles positioned generally above the slide tray, wherein the one or more fluidic components fluidically connect at least one reagent container holding the one or more stains to the one or more nozzles; (iv) solvent-exchanging the samples; and (v) coverslipping the samples with separate coverslips, wherein the aforementioned steps are automatically performed by an apparatus comprising two or more workstations between which the slide tray holding the slides is moved during processing.

In some embodiments, after the specimens are processed, a user can transport specimen-bearing slides to the imaging apparatus. In some embodiments, the imaging apparatus is a brightfield imager slide scanner. One brightfield imager is the iScan Coreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application Publication No. 2014/0178169, filed on Feb. 3, 2014, entitled IMAGING SYSTEMS, CASSETTES, AND METHODS OF USING THE SAME. International Patent Application No. PCT/US2010/002772 and U.S. Patent Application Publication No. 2014/0178169 are incorporated by reference in their entities. In other embodiments, the imaging apparatus includes a digital camera coupled to a microscope.

Control System

With reference to FIG. 1A, the transducer 30 may be controlled with a controller 60. In some embodiments, and as depicted in FIG. 1E, the transducer may be communicatively coupled to a switch or timer 61, an amplifier 62, and/or a signal generator 63. In some embodiments, the control system comprises a printer circuit board assembly (PCBA) that includes the amplifier and the signal generator.

In some embodiments, the control system comprises a power subsystem which prepares the electric input for use by the signal generator. In some embodiments, the signal generator produces an oscillating electrical signal of sufficient amplitude and frequency to drive the acoustic source (e.g. transducer). In some embodiments, the acoustic source (e.g. transducer) transforms the electrical signal supplied by the signal generator into acoustic vibrations. In some embodiments, the control system is contained within a casing. In some embodiments, the control system may be communicatively coupled to a computer 64. In some embodiments, the control system for the transducer is controller used to control an automated staining apparatus.

In some embodiments, the control system may further comprise one or more sensors for monitoring the acoustic waves provided to the microscope slide. In other embodiments, the control system may comprise one or more feedback mechanisms to monitor mixing of the one or more fluids present on the surface of the slide.

Optical or video detection and analysis can be employed to optimize mixing. By way of example, optical or video detection may be used to detect changes in color as a pigmented reagent mixes into a clear fluid. Other optical measurements such as spectral excitation, absorption, light scattering, fluorescence, luminescence, emission, polarization microscopy, Raman scattering, and spectral analysis also can be used to monitor mixing of fluids in contact with the sample on the surface of the microscope slide. The data may be acquired and analyzed by the computer or control system that is controlling the mixing process. For example, if sufficient mixing is achieved based on the received data, the transducer may be turned off. By way of another example, if mixing is insufficient based on the received data, the controller may increase the time in which the transducer is turned on, or the controller may change the frequency of the transducer, or power on additional transducers.

Methods

Another aspect of the present disclosure provides methods of distributing and/or mixing a fluid on the surface of a microscope slide by introducing low frequency acoustic waves (e.g. frequencies that will not damage cells, frequencies below 2000 Hs, etc.) to the microscope slide. In some embodiments, the introduction of the acoustic waves facilitates the formation of a substantially uniform distribution of a fluid over a biological sample provided on the surface of the microscope slide. For example, a fluid may be dispensed to a predetermined area on the surface of a microscope slide and, upon activation of the acoustic source and the introduction of acoustic waves, the fluid may be distributed beyond the initial area of dispensing. In some embodiments, the distribution of fluids on the surface of the microscope slide through the introduction of acoustic waves may be used to facilitate the replenishment of fluids (e.g. a reagent) on a biological sample mounted on the surface of the slide. For example, a biological sample may absorb a reagent deposited on its surface (or may unevenly absorb a reagent) and eventually an amount of reagent in contact with the biological sample may be substantially depleted (or depleted from a particular region or portion of the sample). Activation of an acoustic source may facilitate the distribution of another aliquot of the reagent to the biological sample, thus replenishing the reagent in contact with the biological sample. Activation of an acoustic source may also facilitate the redistribution of the reagent from other areas of the slide to the biological sample faster than diffusional means, thus replenishing the reagent in contact with the biological sample.

In other embodiments, a first fluid may already be already present on the surface of the microscope slide (e.g. a fluid puddle) and, following introduction of a second fluid, e.g. a reagent, the second fluid may be substantially uniformly distributed within the first fluid following the introduction of acoustic waves. In some embodiments, by substantially uniformly distributed, it is meant that reagent concentrations between two separate points on the slide differ by no greater than 15% in magnitude. In some embodiments, by substantially uniformly distributed, it is meant that reagent concentrations between two separate points on the slide differ by no greater than 10% in magnitude. In other embodiments, by substantially uniformly distributed, it is meant that reagent concentration between two separate points on the slide differ by no greater than 5% in magnitude. In yet other embodiments, by substantially uniformly distributed, it is meant that reagent concentration between two separate points on the slide differ by no greater than 2% in magnitude. Of course, the skilled artisan will appreciate that any number of fluids may be deposited on the surface of a microscope slide and each of those fluids may be mixed, i.e. substantially uniformly distributed within one another, through the introduction of acoustic waves.

In some embodiments, the methods disclosed herein are suitable for distributing and/or mixing any volume fluid on the surface of the slide. In some embodiments, the volume of fluid able to be distributed and/or mixed according to the method disclosed herein ranges from between about 50 μL to about 2000 μL. In some embodiments, the volume of fluid able to be distributed and/or mixed according to the method disclosed herein ranges from between about 50 μL to about 1000 μL. In other embodiments, the volume of fluid able to be distributed and/or mixed according to the method disclosed herein ranges from between about 50 μL to about 750 μL. In yet other embodiments, the volume of fluid able to be distributed and/or mixed according to the method disclosed herein ranges from between about 50 μL to about 500 μL. In yet other embodiments, the volume of fluid able to be distributed and/or mixed according to the method disclosed herein ranges from between about 100 μL to about 500 μL. The skilled artisan will be able to select an appropriate acoustic source, including all operating parameters (e.g. duration of operation, frequency, amplitude, amplitude modulation, frequency modulation, position of the acoustic source relative to the sample, etc.) such that the entire volume present on the slide is substantially uniformly distributed and/or mixed as desired.

Generally, the methods comprise (i) introducing a fluid to the surface of a slide; and (ii) introducing low frequency acoustic waves to the slide. In some embodiments, the methods comprise additional steps including, but not limited to, (a) detection steps for feedback control of the acoustic source, (b) fluid removal steps; and/or (c) additional fluid dispensing steps.

In some embodiments, a method of processing specimen-bearing slides comprises: (i) contacting a sample on the specimen-bearing slide with a first reagent; and (ii) uniformly distributing the first reagent on the specimen-bearing by introducing acoustic waves to the specimen-bearing slide. In some embodiments, the uniform distribution permits advancement of fluid to areas of the slide devoid of the fluid. As noted herein, the acoustic waves may be generated by a transducer in communication with the sample. In some embodiments, the reagent is introduced into a first fluid puddle on the surface of the slide (e.g. a puddle comprising a buffer) or in proximity to a first puddle on the slide. In some embodiments, the reagent is detection probe. In some embodiments, the detection probes are binding moieties specific for a particular target within the biological sample (e.g. antibodies, nucleic acids). In some embodiments, the detection probes utilized are primary antibodies, namely primary antibodies which enable detection of protein targets (or epitopes of protein targets) within the sample. In some embodiments, the primary antibody is conjugated to a detectable label, such as a fluorophore, a hapten, or an enzyme. In other embodiments, the detection probes are nucleic acid probes which enable detection of nucleic acid sequence targets within the sample. In other embodiments, the specific binding moieties are nucleic acid probes, where the nucleic acid probes are conjugated to a detectable label or reporter, such as a chromogen, fluorophore, a hapten, or an enzyme.

In some embodiments, following introduction of the reagent, low frequency acoustic waves are introduced to the sample. In some embodiments, acoustic waves are introduced for a time period ranging from between about 0.5 seconds to about 6 hours. In some embodiments, acoustic waves are introduced for a time period ranging from between about 0.5 seconds to about 240 seconds. In other embodiments, acoustic waves are introduced for a time period ranging from between about 1 second to about 180 seconds. In other embodiments, acoustic waves are introduced for a time period ranging from between about 1 second to about 120 seconds. In other embodiments, acoustic waves are introduced for a time period ranging from between about 1 second to about 60 seconds. In other embodiments, acoustic waves are introduced for a time period ranging from between about 1 second to about 30 seconds. In other embodiments, acoustic waves are introduced for a time period ranging from between about 1 second to about 15 seconds. In other embodiments, acoustic waves are introduced for a time period ranging from between about 5 second to about 10 seconds.

In some embodiments, the method further comprises detecting whether the fluid and/or reagent are adequately distributed or mixed (e.g. by using the feedback mechanisms described herein). If the detection step determines that the fluid and/or reagent are not adequately mixed, operating parameters of the acoustic source may be adjusted (e.g. frequency, amplitude, duration of operation, pulsed versus continuous introduction of acoustic waves, or any combination thereof).

In some embodiments, the sample is pulsed with acoustic waves. In some embodiments, the pulsing of the sample with acoustic waves may be at constant intervals. For example, the sample may be pulsed with acoustic waves for a certain predetermined amount of time (e.g. about 0.5 second intervals) followed by a predetermined amount of time in which no acoustic waves are introduced (e.g. about 1 second intervals). In other embodiments, the pulsing of the sample with acoustic waves may be at non-constant intervals. In other embodiments, the determination as to whether the pulse the sample with acoustic waves may be determined by using a detector which provides feedback as to the extent of mixing, or a detector which is able to detect whether a portion of a slide or sample requires replenishment.

In some embodiments, the sample may be pulsed with acoustic waves throughout the period of time in which a reagent is in contact with the sample (e.g. during an incubation period). For example, if an antibody is introduced to a sample and a protocol calls for the antibody to remain in contact with the sample for about a 360 second time period (e.g. an incubation period), acoustic waves may be introduced into the sample for a predetermined amount of time at set intervals during the incubation period. For example, a pulse of acoustic waves may be introduced for 5 second time intervals at times 0, +30 seconds, +60 seconds, +90 seconds, +120 seconds, +150 seconds, +180 seconds, +210 seconds, +240 seconds, +270 seconds, +300 seconds, and +330 seconds following introduction of the antibody. Of course, rather than pulse the sample with acoustic waves at predetermined intervals or for predetermined amounts of time, a feedback control device (such as described herein) may be utilized to determine whether the introduction of pulses of acoustic waves is necessary, including the length of time for a pulse.

In other embodiments, the slide or sample may be pulsed with acoustic waves every time fluid is dispensed to the slide or sample and for any purpose (i.e. fluid replenishment, fluid dispersing, and/or fluid mixing). For example, if a protocol calls for adding a certain aliquot of fluid every two minutes, acoustic waves may be supplied to the slide and/or sample for at least a predetermined amount of time each time an aliquot is added. Of course, additional pulses may be supplied between dispense cycles as needed and as described above.

In addition, if a specific system or instrument calls for moving a slide between different stations or processing areas of the system or instrument (e.g. a sample staining area, a sample incubation area), acoustic waves may be pulsed into the sample before and/or after movement of the slide to ensure that fluid is adequately distributed and/or mixed before, during, and after any such movements. Following mixing of the first reagent into the first fluid puddle, the mixed first reagent/fluid puddle may be removed from the surface of the slide. Subsequently, first detection reagents may be introduced and then distributed on the surface of the slide or mixed with a second fluid puddle existing on the slide. In some embodiments, the first detection reagents are specific for a label of the detection probe. For example, if the label is an enzyme, a substrate (a detectable moiety, e.g. a chromogenic moiety) for the enzyme may be introduced such that a colored precipitate may be detected. In yet other embodiments, an anti-label antibody (a secondary antibody) is introduced to elicit detection, where the anti-label antibody is specific to the label of the detection probe. For example, if the label is a hapten, an anti-hapten antibody specific to the hapten label is introduced, where the anti-hapten antibody comprises a detectable moiety. In some embodiments, the detectable moiety of the anti-hapten antibody is an enzyme, and a substrate for the enzyme is further introduced to detect the detection probe and target. The detectable moiety may then be detected according to processes known to those of ordinary skill in the art. The introduction of detection probes and/or detection reagents may be repeated "n" number of times to account for any desired number of targets within the sample.

The methods disclosed herein are also suitable for multiplex assays. For example, a first detection probe specific to a first target and a second detection probe specific to a second target may be introduced simultaneously or sequentially. Once both the first and second detection probes are introduced to the sample, acoustic waves may be introduced to the sample such that the first and second detection probes are mixed and uniformly distributed. Without wishing to be bound by any particular theory, it is believed that an even distribution of the first and second detection probes may facilitate a uniform detection probe concentration during staining and/or a reduction in staining artifacts. The skilled artisan will appreciate that any number of detection probes may be simultaneously or sequentially introduced to the sample on the surface of the slide, and the "n" number of detection probes may be mixed through the introduction of acoustic waves. As noted herein, the acoustic waves may be generated by an acoustic source in communication with the sample or as otherwise described herein. In some embodiments, acoustic waves are introduced for a time period ranging from between about 0.5 seconds to about 6 hours. In some embodiments, acoustic waves are introduced for a time period ranging from between about 0.5 seconds and 240 seconds. Following introduction of the detection probes, one or more detection reagents may be introduced, again either simultaneously and/or sequentially, and again mixed through the introduction of acoustic waves.

In some embodiments, a method of replenishing a fluid or reagent comprises: (i) contacting a sample on the specimen-bearing slide with a first reagent; (ii) allow time for the reagent to react with or be absorbed by the sample; and (iii) uniformly distributing the first reagent on the specimen-bearing by introducing low frequency acoustic waves to the specimen-bearing slide, thereby replenishing reagent to those areas that have been at least partially depleted of reagent. In some embodiments, the method optionally comprises the step of introducing additional aliquots of the first reagent prior to uniformly distributing the first reagent through the introduction of acoustic waves. As noted herein, the acoustic waves may be generated by a transducer in communication with the sample. In some embodiments, the reagent is introduced into a first fluid puddle on the surface of the slide (e.g. a puddle comprising a buffer). In some embodiments, the reagent is detection probe. In some embodiments, the detection probes are binding moieties specific for a particular target within the biological sample. In some embodiments, the detection probes utilized are primary antibodies, namely primary antibodies which enable detection of protein targets (or epitopes of protein targets) within the sample. In some embodiments, the primary antibody is conjugated to a detectable label, such as a fluorophore, a hapten, or an enzyme. In other embodiments, the detection probes are nucleic acid probes which enable detection of nucleic acid sequence targets within the sample. In other embodiments, the specific binding moieties are nucleic acid probes, where the nucleic acid probes are conjugated to a detectable label or reporter, such as a chromogen, a fluorophore, a hapten, or an enzyme.

In some embodiments, a method of processing specimen-bearing slides comprises: (i) dispensing a first fluid onto a first portion of a microscope slide; and (ii) distributing the first fluid on the specimen-bearing by introducing acoustic waves to the specimen-bearing slide. In some embodiments, the first fluid is distributed from the first portion of the microscope slide to at least a second portion of the microscope slide. In some embodiments, the first portion of the slide is a portion which does not comprise a sample; and wherein the second portion of the slide comprises a biological sample. In some embodiments, the fluid comprises a detection probe. In some embodiments, the detection probes are binding moieties specific for a particular target within the biological sample. In some embodiments, the method further comprises the step of introducing additional aliquots of fluid to the slide (at any region), and then distributing the fluid through the introduction of acoustic waves.

EXAMPLES

General Experimental Protocol

A 45 mm diameter transducer (4 ohm, 5 W, Adafruit.com Product ID=1784) was to mix fluids on-slide. An amplifier IC board (Adafruit Product ID=1552; TPA2012) was required to power the transducer. The input into the amplifier is the signal generator sine wave and the amplifier output to the transducer is a PWM wave. The amplifier IC, TPA2012D2, is a stereo class D audio amplifier with 2×2.1 outputs, shown in FIG. 3. The board comes with pins to adjust the gain of the amplifier, all experiments were run with a 24 dB gain. Two shutdown pins (SDR and SDL) were used to turn the transducer on/off via a PRISM board and Atlas software. This provided the advantage of specifying time lengths to mix and understand how the transducer ON:OFF ratio and period time length effected mixing. The signal generator used was the Agilent 33512B. Channel 1 of the signal generator was used to output a sine wave with a specific frequency and amplitude. The frequency was the resonance of the assembly.

The camera used was an Edmunds Optics EO-0413C LE. The software to view images is uEye cockpit which can be downloaded from the Edmunds optics website. The fps to record can be specified in the software properties options.

The transducer is screwed to the slide processing station (SPS) heater plate and the bottom of the transducer is fixed to the lab bench. A wetted slide is placed on the SPS heater place. The label end of the slide is taped down to the slide alignment plate and SPS heater plate.

Figure 6:
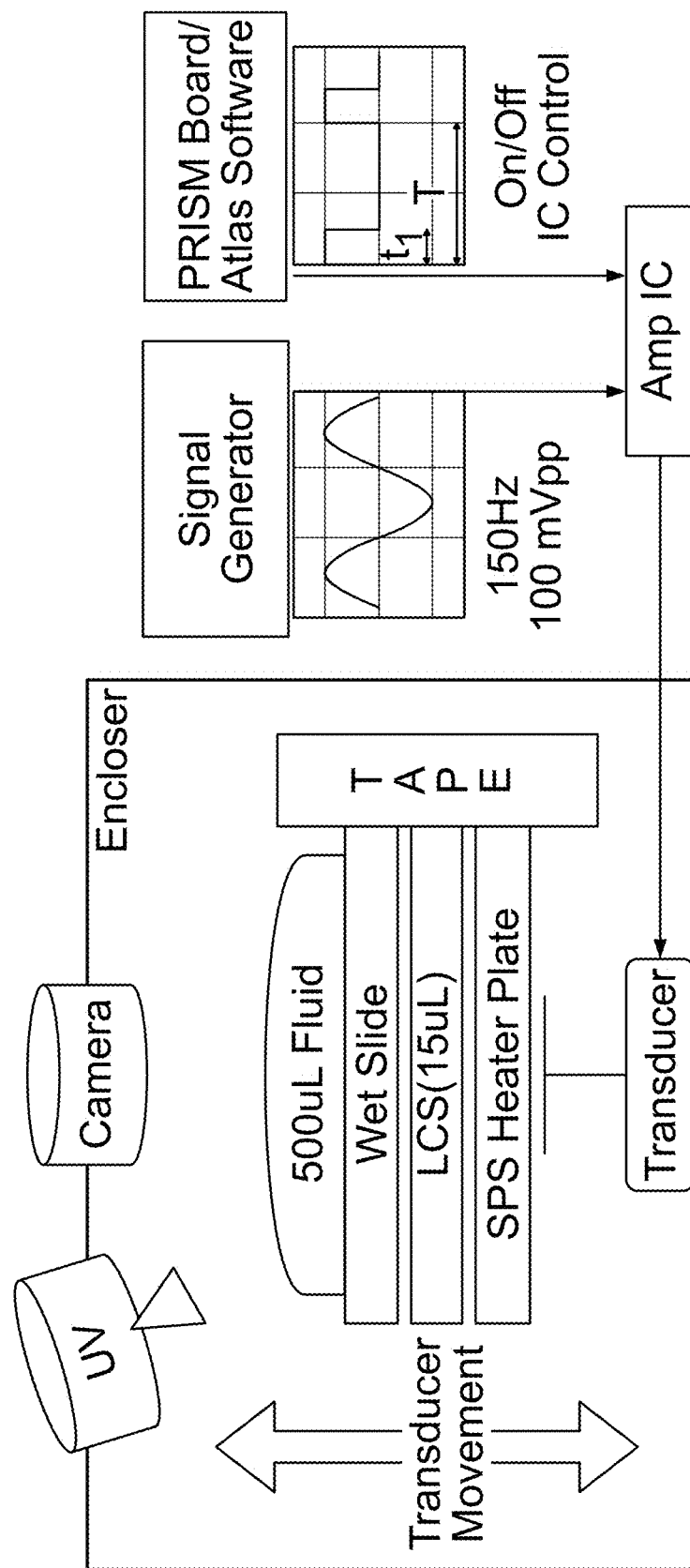
FIG. 6 illustrates a side view of a system comprising microscope slide holder in communication with a transducer, the system also including elements for feedback control. The slide processing station (SPS) heater plate is the fixture where the slide is placed. The fluid volume on the slide is mixed via the displacement of the transducer. A signal generator supplies a frequency and voltage to drive the transducer. The UV light, camera, and enclosure are used to visualize and quantify the fluid mixing by enhancing the fluorescent signal and eliminating interference from ambient light.
Figure 7A:
FIGS. 7A, 7B, 7C, and 7D illustrate the distribution of a dye placed at the corners of a slide over time as acoustic waves are introduced.
Figure 7B:
Figure 7C:
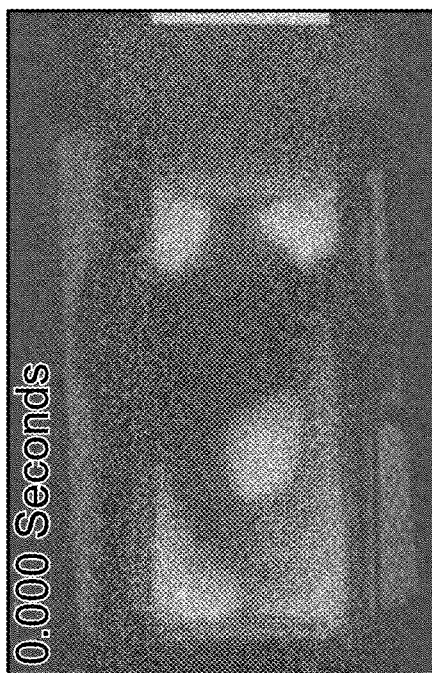
Figure 7D:

A diagram of the setup is presented in FIG. 6.

Example 1

Mixing of Fluorescein into a Buffer

Overview

A fluid volume of 500 µL total, fluorescein dye and salt buffer, was pipetted on the slide to be mixed. The signal generator was configured to produce a sine wave of about 150 Hz and about 100 mVpp to actuate the transducer vertically up/down, thereby enabling mixing of the fluid on the slide.

To capture and visualize fluid mixing, a UV light, fluorescein dye, camera, and enclosure were required (see FIG. 6), although none of these components are necessary for mixing. The fluorescein was placed in volumes of 10 µL in 5 areas on the slide, the four corners and in the center.

General Procedure

1. To improve coupling between the slide and SPS heater plate, 15 µL of liquid cover slip (LCS) is pipetted on the SPS heater plate;

2. Wet slide—dip slide in reagent and flick slide;

3. Place slide on heater plate; label side up. Tape down label end of slide up to the machining mark on the slide alignment plate;

4. Add 450 µL of a salt buffer and add five spots in corners and center of fluorescein at 10 µL in each spot to visualize mixing;

5. Turn on signal generator to drive the transducer at 150 Hz and 100 mVpp and mix fluid on-slide; and 6. Turn off transducer, remove slides, and wipe SPS heater plate clean with alcohol.

Results

The set-up parameters for the experiment are shown in Table 1.

TABLE 1

Experimental parameters for data presented.
Experimental Parameters

| Transducer Size | 45 mm diameter |
|---|---|
| Transducer Position | Below slide center |
| Slide fixture | SPS heater plate with tape |
| Input Amplitude | 100 mVpp |
| Input Frequency | 150 Hz |
| Total Fluid volume | 500 µL |

The results of mixing are illustrated in FIG. 7. The individual frames of FIG. 7 illustrate the fluorescein dye spreading across the fluid volume on-slide. About one second into mixing, the dye in the corners of the free end of the slide and the center of the slide mixed. The dye in the corners that were closest to the taped end of the slide, began mixing but such mixing at those locations took longer, it is believe, due to that end being more mechanically stiff from being held down by tape. Qualitatively, we approximated it took the dye about 7 seconds for the fluid to uniformly spread across the slide. Applicants have thus shown that the contactless mixing means disclosed herein advantageously allows for mixing of fluids without contacting the sample any physical device or gaseous stream. It is believed that this eliminates the concern of potential cross contamination between slides if this technology is incorporated into a staining platform. We do not anticipate tissue damage, since the frequency to mix here is relatively low, about 150 Hz. Without wishing to be bound by any particular theory, it is believed that cell damage occurs in the ultrasonic range (greater than about 18,000 Hz) and in commercial ultrasonic processors the cell damage is caused by shear forces produced by bubble bursting. In the systems provided herein, no cavitation or bubble bursting was observed.

Example 2

Quantification of Mixing

The motivation of this experiment was to quantify the degree of mixing in the staining area over time. Due to the ripples, waves, and shadowing caused by vibration waves across the fluid, turning off the transducer was necessary to capture frames in which the pixel values contained no interference.

Figure 8A:
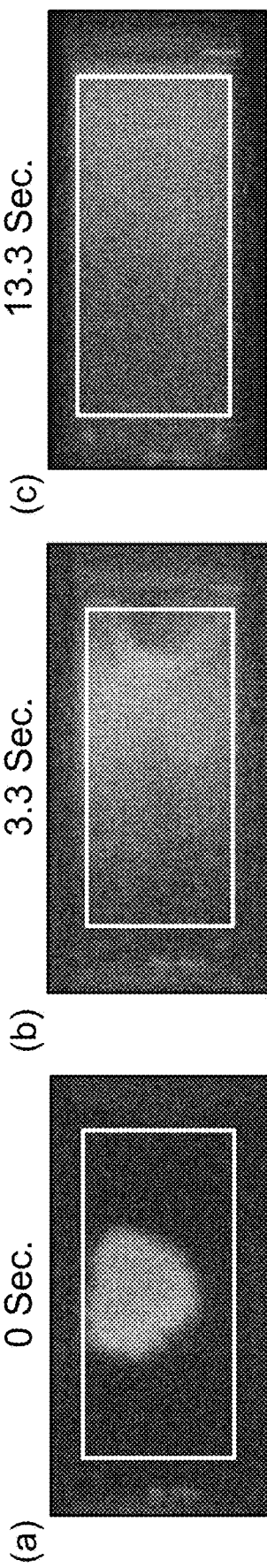
FIG. 8A illustrates the distribution of a dye placed at the corners of a slide over time as acoustic waves are introduced.

The experimental setup was similar to that presented within Example 1 herein. To quantify mixing, data from individual frames of video data (see FIG. 8A) was extracted and the standard deviation of the pixels within a region of interest were determined (see FIG. 8B). More specifically, FIG. 8A provides (a) an image of fluid volume on-slide before mixing. The white box designates the Region of interest (ROI). The ROI is 398×181 pixels which equates to 70% of slide staining area or about 50×20 mm. The ROI designates the area of the frames that will be analyzed to quantify mixing. (b) and (c) 3.3 sec. and 13.3 sec. of mixing. These frames were captured when the transducer was paused to capture the fluid without the mixing artifacts. More specifically, FIG. 8B illustrates (a) a standard deviation of the green value of the pixels in a region of interest (ROI) is calculated for each frame; provides (b) a plot of the green value standard deviation in the ROI during a mixing process. In summary, as the fluorescein mixed throughout predetermined regions of interest, the individual green values of each pixel started to trend towards the same value of green neighboring pixels. It was hypothesized that an ideally, uniformly mixed solution would have a standard deviation of 0.

Example 3

Input Voltage Sweep

Figure 9:
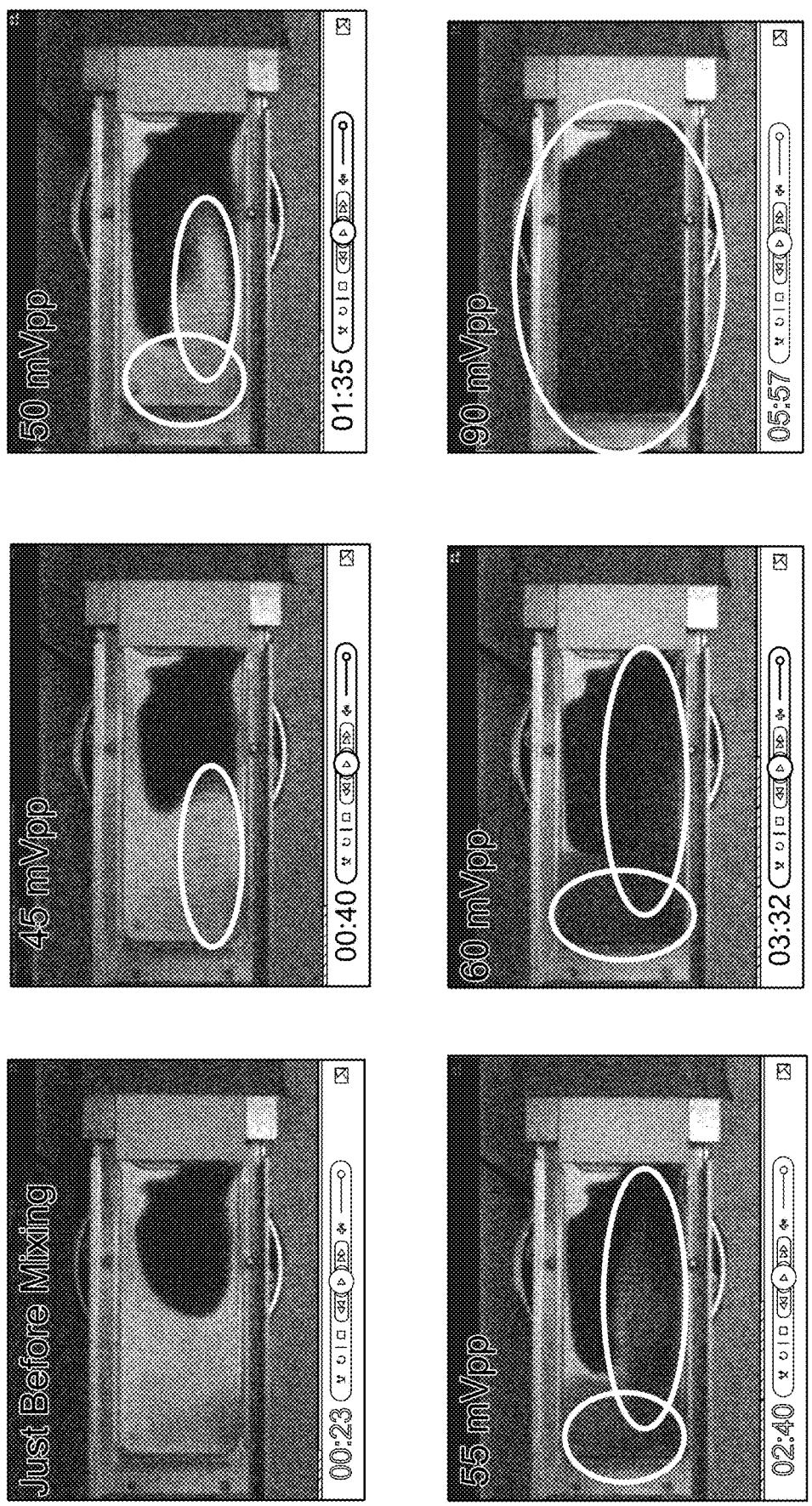
FIG. 9 illustrates the results of sweeping the input voltage from a first voltage to a second higher voltage and illustrates that an area of the standing wave pattern increases as the input voltage increases.

The motivation for this experiment was to visualize and observe wave the propagation in the fluid on-slide at different input voltages from 45-90 mVpp. A transducer was turned on, and the voltage was swept at five different input values consecutively—45 mVpp, 50 mVpp, 55 mVpp, 60 mVpp, and 90 mVpp. As the voltage was increased, it was observed that the area of standing waves across the slide increased (see FIG. 9). At 45 mVpp the standing waves were restricted to one corner of the slide, while at 90 mVpp the standing waves were present across the entire slide. At 50 mVpp, standing waves could be seen on the end of the slide that was most free to travel vertically. This suggested that the slide might be acting as a cantilever (see FIG. 4 herein for embodiments employing a cantilever design).

Example 4

Fluid Volume On-Slide

For this set of experiments, the fluid volume on-slide tested was 300 µL and 100 µL to observe coverage and mixing. The transducer electronic set up and procedure was as described in Example 1 herein. The input to the transducer was 150 Hz (resonance) and 100 mVpp. Fluorescein was the dye used to observe mixing and coverage. The dye was 10% of the total fluid volume on-slide.

Figure 10A:
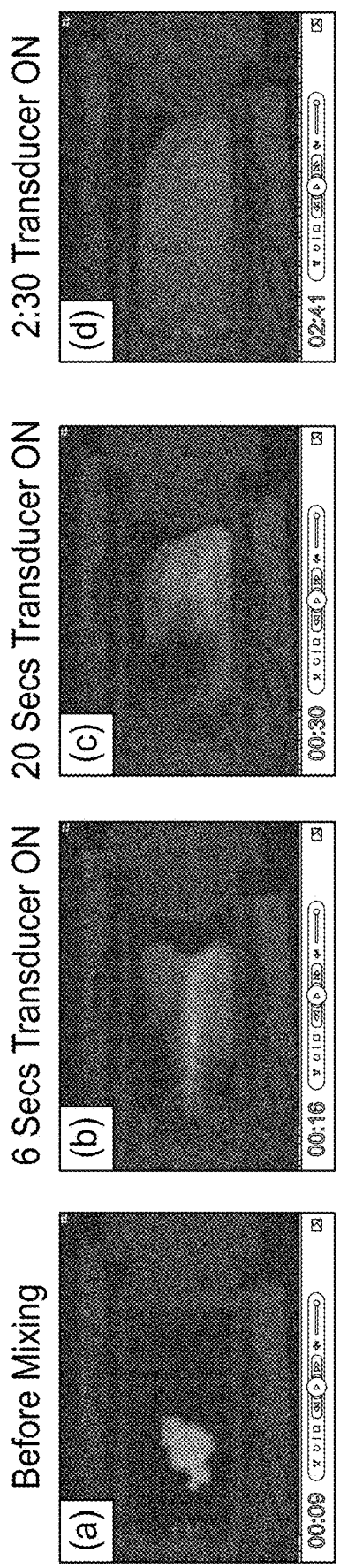
FIG. 10A illustrates the distribution of a dye over time as acoustic waves are introduced.

A 300 µL on-slide fluid volume demonstrated coverage and mixing, shown in FIG. 10A. More specifically, FIG. 10A illustrates (a) 30 µL fluorescein dye and 270 µL Apollo buffer volume on-slide before mixing (b) 6 seconds transducer on. The fluid front is driven towards the label end of the slide, spreading the fluid across the slide. (c) 20 secs of mixing (d) 2 minutes and 30 seconds of mixing-fluid has covered almost entire slide and the dye has mixed through the solution. A 100 µL on-slide fluid volume demonstrated mixing but not coverage, shown in 10B. More specifically, FIG. 10B illustrates (a) 10 µL fluorescein dye and 90 µL Apollo buffer solution before mixing. (b) 20 secs of mixing. The fluid settles to one end of the slide, due to the SPS heater and transducer being un-level. (c) 1 minute 20 secs of mixing. Fluid mixed, but the fluid doesn't spread across the slide (d) Visible light image of fluid mixed. A summary of the results from the 500 µL, 300 µL, and 100 µL mixing experiments are shown in Table 1 which follows:

TABLE 2

Summary of results from volume experiments on-slide. As the volume decreases, coverage is limited, but the fluid volume is mixed at all fluid volumes.

|  | Mixing | Coverage |
|---|---|---|
| 500 µL | Y | Y |
| 300 µL | Y | ~ |
| 100 µL | Y | N |

Example 5

Transducer Position

Figure 5B:
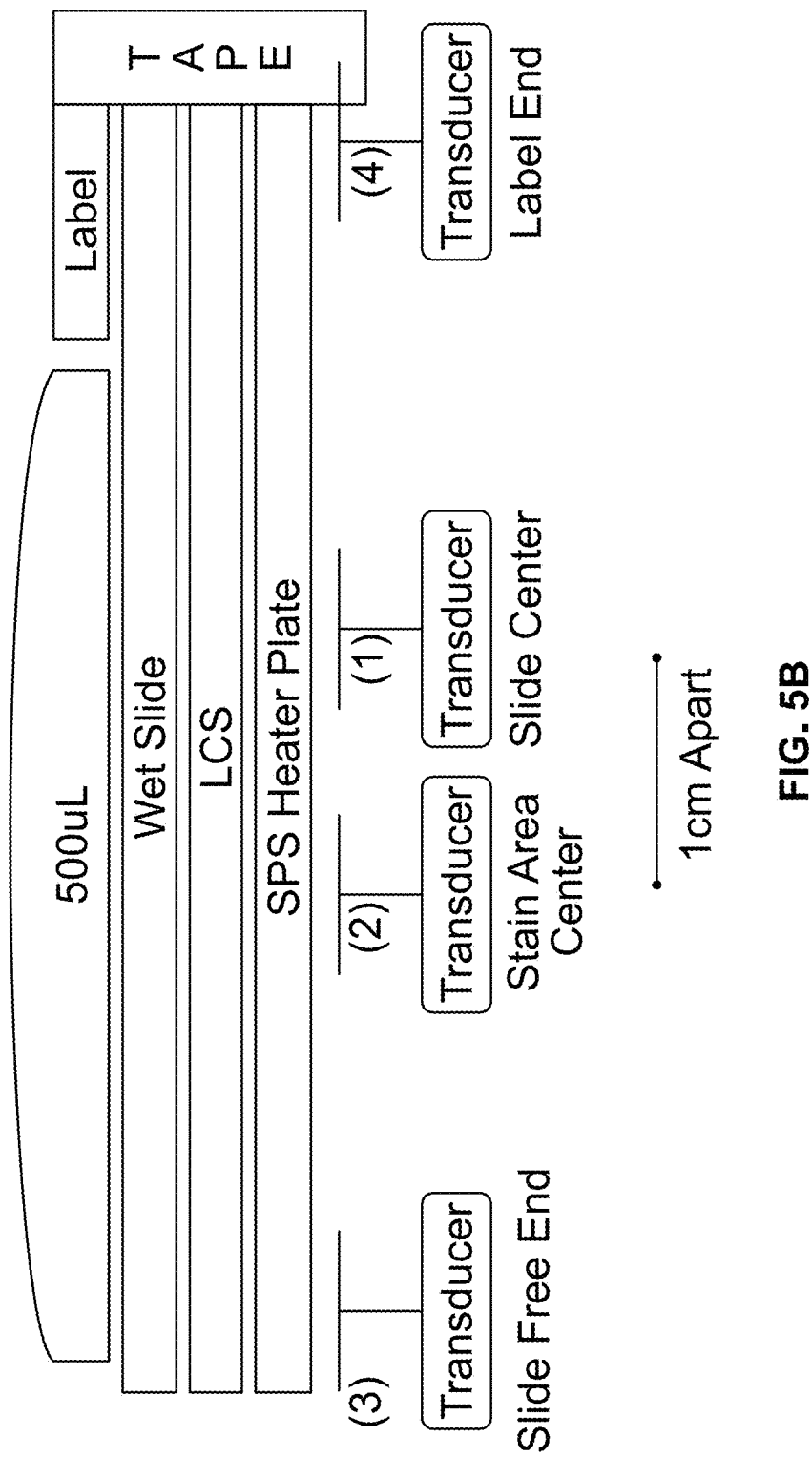
FIG. 5B provides a side view of a microscope slide holder in communication with a plurality of transducers, the slide holder also including a heater plate.

The objective of this set of experiments was to sweep the transducer position along the SPS heater plate to qualitatively determine the transducer location which demonstrates the fastest mixing. Four locations were tested, such as illustrated in FIG. 5B. The set up and procedure for these experiments is as described in Example 1. Fluorescein was used as the dye to visualize mixing, 50 µL of fluorescein total distributed in the corners and center of the slide in 10 µL portions in a salt buffer volume of 450 µL.

The results are summarized in Table 2 which follows. Each set up was evaluated for the time to qualitatively determine if the fluid on-slide was mixed homogenously. Mixing fluid with the transducer on either end of the SPS heater plate, free end or label end, required higher input voltages and time to fully mix the solution on slide. The transducer appeared to mixed fluid on-slide the fastest when positioned at slide center (at about 7 seconds).

TABLE 3

Summary of results from sweeping transducer position along SPS heater plate Positioning the transducer at the slide-center, appears to result in the fastest time to fully mixed. Positioning the transducer at the staining area center, appears to be a promising position to mix, but more work will have to be done to optimize the position and input parameters.

| Position | Results Summary - Input parameters to generate waves across entire slide | | Qualitative "fully mixed" |
|---|---|---|---|
| | Frequency (HZ) | Voltage (mVpp) | Time (seconds) |
| Slide Center | 150 | 100 | ~7 |
| Staining Area Center (1) | 160 | 60 | ~20 |
| Staining Area Center (2) | 150 | 100 | ~30 |
| Slide Free End (1) | 230 | 140 | 60+ |
| Slide Free End (2) | 150 | 250 | 60+ |

Example 6

Transducer Period vs On:Off Ratio

It was observed in early mixing experiments with the transducer that turning the transducer on and off appeared to cause the fluid to stretch (pushed outwards) and contract (relax) on the slide, respectively. These experiments considered whether this stretching and contracting might enhance mixing.

Mixing with pauses in the transducer introduced three parameters—1) Total transducer period–Time length of single on and off cycle; 2) Transducer on time; and 3) Transducer off time.

Figure 11:
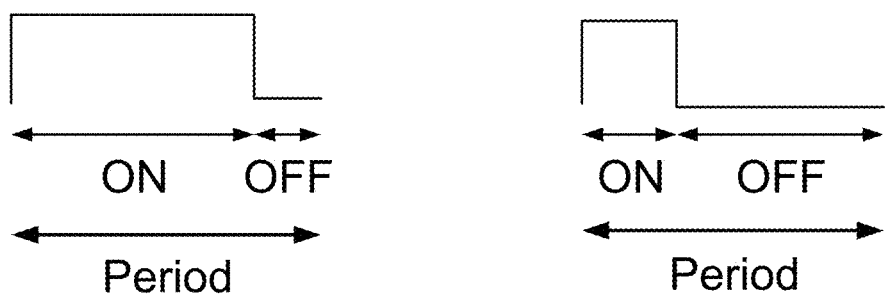
FIG. 11 illustrates the relationship between total transducer period time, on time, and off time.

A set of experiments was designed to explore multiple transducer period time lengths and the extremes of the transducer ON:OFF ratio. The set up for these experiments is as described with reference to Example 1. Software was used to set the On:Off time periods (see FIG. 11).

Table 3 summarizes the results the study where the approximate time to mix is the time for the fluid to be uniformly mixed on-slide. This was determined qualitatively. 5 seconds was chosen as the maximum period time, since uniform mixing on-slide is achieved in 7 seconds with this set up.

TABLE 4

Results of mixing for different transducer periods and on:off ratios. Approx. time to mix refers to the time for the fluorescein dye to be uniformly mixed in the solution on-slide (when transducer run without pauses, it takes about 7 seconds to mix).

| | | Period | | |
|---|---|---|---|---|
| Amplitude = 100 mVpp | | 0.5 seconds Approx. time to mix | 2 seconds Approx. time to mix | 5 seconds Approx. time to mix |
| On Ratio | 90% | 15 seconds | 15 seconds | 4.5 > t < 10 seconds |
| | 10% | No Mix | 118 seconds | 118 seconds |

The results indicated that a longer transducer ON time promoted mixing. Since this was a qualitative observation and since the transducer may have been producing ripples in the fluid while on, it was difficult to tell with absolute certainty when the solution was homogenously mixed. But, it was estimated that a transducer period of about 5 seconds with about 90% "on" ratio appeared to mix the fluid as fast as when the transducer was "on" 100% of the time. Therefore, turning the transducer "off" seems to have had no impact on expediting the mixing time.

Additional Embodiments

Additional Embodiment 1. A slide holder for contactlessly mixing fluid on a specimen-bearing microscope slide comprising a slide support and at least one transducer in communication with the slide support, wherein the at least one transducer operates at a frequency ranging from between about 1 Hz to about 1 kHz.

Additional Embodiment 2. The slide holder of additional embodiment 1, wherein the at least one transducer is in communication with a lower surface of the slide support.

Additional Embodiment 3. The slide holder of additional embodiment 1 or 2, wherein the at least one transducer is positioned along the slide support at a region substantially corresponding to a center of a specimen end of the specimen-bearing microscope slide.

Additional Embodiment 4. The slide holder of any of the preceding additional embodiments, wherein at least two transducers are in communication with the slide support.

Additional Embodiment 5. The slide holder of additional embodiment 4, wherein each of the at least two transducers are configured such that first acoustic waves supplied by a first of the at least two transducers are not cancelled out by second acoustic waves supplied by a second of the at least two transducers.

Additional Embodiment 6. The slide holder of additional embodiment 5, wherein the at least two transducers are out-of-phase with each other.

Additional Embodiment 7. The slide holder of any of the preceding additional embodiments, wherein the frequency of the at least one transducer ranges from between about 1 Hz to about 500 Hz.

Additional Embodiment 8. The slide holder of any of the preceding additional embodiments, wherein the frequency of the at least one transducer ranges from between about 50 Hz to about 500 Hz.

Additional Embodiment 9. The slide holder any of the preceding additional embodiments wherein the frequency of the at least one transducer ranges from between about 100 Hz to about 200 Hz.

Additional Embodiment 10. The slide holder of any of the preceding additional embodiments, wherein a power supplied to the at least one transducer ranges from between about 40 mVpp to about 350 mVpp.

Additional Embodiment 11. The slide holder of any of the preceding additional embodiments, wherein the slide support has a support surface configured to support at least a portion of a back surface of the specimen-bearing microscope slide, the back surface being opposite a specimen-bearing surface.

Additional Embodiment 12. The slide holder of additional embodiment 11, wherein the slide support further comprises a heating element.

Additional Embodiment 13. The slide holder of any of the preceding additional embodiments, further comprising a controller in electrical communication with the at least one transducer.

Additional Embodiment 14. The slide holder of additional embodiment 13, wherein the controller includes an amplifier and a signal generator.

Additional Embodiment 15. A slide holder comprising a slide support and at least one acoustic source for introducing low frequency vibrations to the microscope slide such that one or more fluids present on the surface of the microscope slide are contactlessly mixed.

Additional Embodiment 16. The slide holder of additional embodiment 15, wherein the low frequency vibrations are acoustic waves.

Additional Embodiment 17. The slide holder of any of additional embodiments 15 to 17, wherein the acoustic source for introducing low frequency vibrations is selected from the group consisting of a mechanical transducer, piezoelectric transducer, and a surface acoustic wave device.

Additional Embodiment 18. A tray comprising a plurality of the slide holders of any of the preceding additional embodiments, each slide holder of the plurality of the slide holders positioned in substantially horizontal and co-planar, spaced positions.

Additional Embodiment 19. A method of processing a specimen-bearing slide comprising: (i) contacting a sample on the specimen-bearing slide with a first reagent; and (ii) uniformly distributing the first reagent on the specimen-bearing by introducing low frequency acoustic waves to the specimen-bearing slide, the low frequency acoustic waves having a frequency ranging from about 1 Hz to about 1 Khz.

Additional Embodiment 20. The method of additional embodiment 19, wherein the low frequency acoustic waves are generated by at least one transducer in communication with the specimen-bearing slide.

Additional Embodiment 21. The method of any of additional embodiment 19 or 20, wherein the first reagent is dispensed into an existing fluid present on the specimen-bearing slide, and wherein the acoustic waves generated by the at least one transducer uniformly mixes the first reagent within the existing fluid.

Additional Embodiment 22. The method of additional embodiment 21, wherein the existing fluid is a buffer.

Additional Embodiment 23. The method of additional embodiment 20, wherein the at least one transducer is configured to operate at a frequency that ranges from between about 1 Hz to about 500 Hz.

Additional Embodiment 24. The method of additional embodiment 23, wherein the frequency ranges from between about 50 Hz to about 500 Hz.

Additional Embodiment 25. The method of additional embodiment 23, wherein the frequency ranges from between about 100 Hz to about 200 Hz.

Additional Embodiment 26. The method of any of additional embodiments 19 to 25, wherein acoustic waves are introduced into the sample for a time period ranging from between about 1 second to about 120 seconds.

Additional Embodiment 27. The method of additional embodiment 26, wherein the time period ranges from between about 1 second to about 60 seconds.

Additional Embodiment 28. The method of additional embodiment 26, wherein the time period ranges from between about 1 second to about 30 seconds.

Additional Embodiment 29. The method of additional embodiment 26, wherein the time-period ranges from between about 2 seconds to about 15 seconds.

Additional Embodiment 30. The method of additional embodiment 20, wherein a bottom surface of the specimen-bearing slide is at least partially in contact with a substrate, and wherein the at least one transducer is coupled to the substrate.

Additional Embodiment 31. The method of additional embodiment 21, wherein the first reagent is a detection probe specific to a first target within the sample.

Additional Embodiment 32. The method of any of additional embodiments 19 to 31, further comprising the step of contacting the sample with a first detection reagent to facilitate detection of the first detection probe.

Additional Embodiment 33. The method of any of additional embodiments 19 to 32, further comprising contacting the sample with a second detection probe specific to a second target.

Additional Embodiment 34. The method of additional embodiment 33, wherein the second detection probe is introduced simultaneously with the first detection probe, and wherein the at least one transducer mixes the first and second detection probes.

Additional Embodiment 35. The method of additional embodiment 33, wherein the first and second detection probes are antibodies.

Additional Embodiment 36. A method of staining a sample comprising: (a) dispensing a reagent into a fluid puddle present on a sample-bearing microscope slide; (b) contactlessly dispersing the reagent into the fluid puddle by introducing low frequency acoustic waves to the slide, wherein the dispersing of the reagent occurs without damaging cells or tissue within the sample.

Additional Embodiment 37. The method of additional embodiment 36, wherein the reagent is substantially uniformly dispersed within the fluid puddle within about 30 seconds after introducing the low frequency acoustic waves.

Additional Embodiment 38. The method of any of additional embodiments 36 to 37, wherein an acoustic source for introducing the low frequency acoustic waves is selected from the group consisting of a mechanical transducer, piezoelectric transducer, and a surface acoustic wave device.

Additional Embodiment 39. The method of additional embodiment 38, wherein the acoustic source operates at a frequency ranging from between about 100 Hz to about 200 Hz.

Additional Embodiment 40. The method of any of additional embodiments 36 to 39, wherein the reagent is a specific-binding moiety.

Additional Embodiment 41. The method of additional embodiment 40, wherein the specific-binding moiety comprises an antibody.

Additional Embodiment 42. The method of additional embodiment 40, further comprising the step of dispensing a second reagent into the fluid puddle.

Additional Embodiment 43. A staining apparatus comprising one or more of the slide holders of additional embodiment 1 and at least one dispenser capable of introducing one or more fluids to a specimen-bearing surface of the specimen-bearing microscope slide.

Additional Embodiment 44. The staining apparatus of additional embodiment 43, further comprising a feedback control device for monitoring a mixing of the one or more fluids introduced to a surface of the specimen-bearing microscope slide.

Additional Embodiment 45. The staining apparatus of any of additional embodiments 43 to 44, wherein dispersing of the one or more fluids occurs without contacting the puddle or sample with any mixing apparatus or gas stream.

Additional Embodiment 46. The staining apparatus of any of additional embodiments 43 to 44, further comprising an active mixing apparatus which contacts a fluid puddle on the surface of the specimen-bearing microscope slide.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A slide holder for contactlessly mixing fluid disposed on the surface of a specimen-bearing microscope slide, wherein the slide holder comprises a slide support and at least one transducer in communication with the slide support, wherein the at least one transducer operates at a frequency ranging from between about 1 Hz to about 1 kHz.

2. The slide holder of claim 1, wherein the at least one transducer is in communication with a lower surface of the slide support, and wherein the at least one transducer is positioned along the slide support at a region substantially corresponding to a center of a specimen end of the specimen-bearing microscope slide.

3. The slide holder of claim 1, wherein at least two transducers are in communication with the slide support, and wherein each of the at least two transducers are configured such that first acoustic waves supplied by a first of the at least two transducers are not cancelled out by second acoustic waves supplied by a second of the at least two transducers.

4. The slide holder of claim 3, wherein the at least two transducers are out-of-phase with each other.

5. The slide holder of claim 1, wherein the frequency of the at least one transducer ranges from between about 1 Hz to about 500 Hz.

6. The slide holder of claim 1, wherein a power supplied to the at least one transducer ranges from between about 40 mVpp to about 350 mVpp.

7. The slide holder of claim 1, wherein the slide support has a support surface configured to support at least a portion of a back surface of the specimen-bearing microscope slide, the back surface being opposite a specimen-bearing surface, wherein the slide support further comprises a heating element.

8. The slide holder of claim 1, further comprising a controller in electrical communication with the at least one transducer, wherein the controller includes an amplifier and a signal generator.

9. A method of processing a specimen-bearing slide comprising: (i) contacting a sample disposed on a surface of on the specimen-bearing slide with a first reagent; and (ii) uniformly distributing the first reagent disposed on the surface of the specimen-bearing by introducing low frequency acoustic waves to the specimen-bearing slide, the low frequency acoustic waves having a frequency ranging from about 1 Hz to about 1 Khz.

10. The method of claim 9, wherein the low frequency acoustic waves are generated by at least one transducer in communication with the specimen-bearing slide.

11. The method of claim 10, wherein a bottom surface of the specimen-bearing slide is at least partially in contact with a substrate, and wherein the at least one transducer is coupled to the substrate.

12. The method of claim 9, wherein the first reagent is dispensed into an existing fluid present on the specimen-bearing slide, and wherein the acoustic waves generated by the at least one transducer uniformly mixes the first reagent within the existing fluid.

13. The method of claim 12, wherein the existing fluid is a buffer.

14. The method of claim 12, wherein the first reagent is a detection probe specific to a first target within the sample.

15. The method of claim 9, wherein acoustic waves are introduced into the sample for a time period ranging from between about 1 second to about 120 seconds.

16. The method of claim 9, further comprising the step of contacting the sample with a first detection reagent to facilitate detection of the first detection probe.

17. The method of claim 9, further comprising contacting the sample with a second detection probe specific to a second target.

18. The method of claim 9, wherein the second detection probe is introduced simultaneously with the first detection probe, and wherein the at least one transducer mixes the first and second detection probes.

19. A method of staining a sample comprising: (a) dispensing a reagent into a fluid puddle present on a surface of a sample-bearing microscope slide; (b) contactlessly dispersing the reagent into the fluid puddle by introducing low frequency acoustic waves to the slide, wherein the dispersing of the reagent occurs without damaging cells or tissue within the sample, wherein an acoustic source for introducing the low frequency acoustic waves is selected from the group consisting of a mechanical transducer, piezoelectric transducer, and a surface acoustic wave device, and wherein the acoustic source operates at a frequency ranging from between about 100 Hz to about 200 Hz.

20. The method of claim 19, wherein the reagent is substantially uniformly dispersed within the fluid puddle within about 30 seconds after introducing the low frequency acoustic waves.

21. The method of claim 19, further comprising the step of dispensing a second reagent into the fluid puddle.

* * * * *